(12) United States Patent
Sisman et al.

(10) Patent No.: US 10,108,526 B2
(45) Date of Patent: Oct. 23, 2018

(54) BUG LOCALIZATION USING VERSION HISTORY

(71) Applicant: Purdue Research Foundation, West Lafayette, IN (US)

(72) Inventors: Bunyamin Sisman, West Lafayette, IN (US); Avinash C. Kak, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 14/091,708

(22) Filed: Nov. 27, 2013

(65) Prior Publication Data
US 2014/0149435 A1 May 29, 2014

Related U.S. Application Data

(60) Provisional application No. 61/730,462, filed on Nov. 27, 2012.

(51) Int. Cl.
*G06F 11/36* (2006.01)
*G06F 8/71* (2018.01)

(52) U.S. Cl.
CPC .............. *G06F 11/362* (2013.01); *G06F 8/71* (2013.01)

(58) Field of Classification Search
CPC ............... G06F 11/079; G06F 11/3688; G06F 17/30914; G06F 17/30722; G06F 17/30241; G06F 17/30646
See application file for complete search history.

(56) References Cited

U.S. PATENT DOCUMENTS

| 7,483,892 | B1 * | 1/2009 | Sommer | G06F 17/3069 |
| 7,685,091 | B2 | 3/2010 | Boone et al. | |
| 8,185,544 | B2 | 5/2012 | Oztekin et al. | |
| 8,589,411 | B1 | 11/2013 | Sung et al. | |

(Continued)

OTHER PUBLICATIONS

Ashok, B. et al., "Debugadvisor: a recommender system for debugging," in Proceedings of the 7th joint meeting of the European software engeering conference an the ACM SIGSOFT symposium on the foundations of software engineering. ACM, 2009, pp. 373-382.

(Continued)

*Primary Examiner* — Mariela Reyes
*Assistant Examiner* — Courtney Harmon
(74) *Attorney, Agent, or Firm* — Purdue Research Foundation

(57) ABSTRACT

A method of searching a corpus including a plurality of files includes automatically determining, using a processor, a historical ranking for each file using respective changeset information. Search term(s) of a query are received. A textual ranking is determined for each file using the search term(s) and contents of that file. The historical and textual rankings are combined to provide a result ranking. A data processing system includes a storage system storing the corpus including the plurality of files, a processor configured to determine the result rankings, and a user interface system configured to receive query results from the processor and present them to a user.

20 Claims, 15 Drawing Sheets

(56) References Cited

U.S. PATENT DOCUMENTS

| | | | | |
|---|---|---|---|---|
| 2006/0253418 A1* | 11/2006 | Charnock | ......... | G06F 17/30716 |
| 2008/0114750 A1* | 5/2008 | Saxena | ............ | G06F 17/30687 |
| 2010/0125540 A1* | 5/2010 | Stefik | ...................... | G06F 17/30 706/12 |
| 2010/0262454 A1* | 10/2010 | Sommer | ............. | G06F 17/3071 706/20 |
| 2011/0202334 A1* | 8/2011 | Abir | .................... | G06F 17/2809 704/4 |
| 2011/0219360 A1* | 9/2011 | Srinivasa | ................ | G06F 17/30 717/124 |
| 2011/0276684 A1* | 11/2011 | Singh | .................... | G06F 9/4856 709/224 |
| 2012/0209847 A1* | 8/2012 | Rangan | ............... | G06F 17/3069 707/737 |

OTHER PUBLICATIONS

Kagdi, H. et al., "Blending conceptual and evolutionary coupliungs to support change impact analysis in source code," in Reverse Engineering (WCRE), 2010 17th Working Conference on, Oct. 2010, pp. 119-128.

Nguyen, A. T. et al., "A topic-based approach for narrowing the search space of buggy files from a bug report," in Automated Software Engineering (ASE), 2011 26th IEEE/ACM International Conference on, Nov. 2011, pp. 263-272.

Rao, S. et al., "Retrieval from software libraries for bug localization: a comparative study of generic and composite text models," in Proceeding of the 8th working conference on Mining software repositories. ACM, 2011, pp. 43-52.

Zimmerman, T et al., "Mining version histories to guide software changes," IEEE Transactions on Software Engineering, pp. 429-445, 2005.

Nagappan, N. et al., "Change bursts as defect predictors," in Software Reliability Engineering (ISSRE), 2010 IEEE 21st International Symposium on. IEEE, 2010, pp. 309-318.

* cited by examiner

| MODEL | MHbP | | | | MHbPd ($\beta_1$ = 1.0) | | |
|---|---|---|---|---|---|---|---|
| | MAP (Imp.) | P@1 (Imp.) | P@5 | p-H1 | MAP (Imp.) | P@1 (Imp.) | P@5 | p-H1a |
| HLM | 0.1318 (+12.27%) | 0.0825 (-3.96%) | 0.0859 | 8.64e-07 | 0.1924 (+63.88%) | 0.1856 (+116.07%) | 0.1313 | 4.14e-08 |
| DLM | 0.1556 (+15.34%) | 0.1375 (+8.18%) | 0.0907 | 7.30e-11 | 0.1896 (+40.55%) | 0.2131 (+67.66%) | 0.1340 | 5.11e-05 |
| lnB2 | 0.1329 (+6.83%) | 0.1306 (+5.58%) | 0.0818 | 2.90e-03 | 0.1704 (+36.98%) | 0.1924 (+55.54%) | 0.1141 | 4.91e-05 |
| lnExpB2 | 0.1447 (+9.04%) | 0.1271 (+2.75%) | 0.0838 | 2.49e-04 | 0.1975 (+48.83%) | 0.2268 (+83.35%) | 0.1265 | 4.24e-06 |
| lnL2 | 0.1481 (+16.43%) | 0.1203 (+20.66%)* | 0.0914 | 1.43e-04 | 0.2007 (+57.78%) | 0.2337 (+134.40%)* | 0.1388 | 3.07e-05 |
| Tf-ldf | 0.1508 (+18.93%)* | 0.1271 (+19.34%) | 0.0893 | 4.61e-06 | 0.2121 (+67.27%)* | 0.2474 (+132.30%) | 0.1416 | 3.50e-06 |

FIG. 7

| MODEL | DHbP | | | | DHbPd ($\beta_2$ = 5.0) | | |
|---|---|---|---|---|---|---|---|
| | MAP (Imp.) | P@1 (Imp.) | P@5 | p-H2 | MAP (Imp.) | P@1 (Imp.) | P@5 | p-H2a |
| HLM | 0.1474 (+25.55%) | 0.1100 (+28.06%) | 0.0962 | 9.28e-09 | 0.2114 (+80.07%)* | 0.2199 (+156.00%)* | 0.1326 | 3.84e-10 |
| DLM | 0.1660 (+23.05%) | 0.1546 (+21.64%) | 0.0928 | 5.51e-07 | 0.2041 (+51.30%) | 0.2268 (+78.44%) | 0.1423 | 1.50e-03 |
| lnB2 | 0.1500 (+20.58%) | 0.1409 (+13.90%) | 0.0907 | 2.73e-06 | 0.1847 (+48.47%) | 0.2165 (+75.02%) | 0.1175 | 1.93e-07 |
| lnExpB2 | 0.1592 (+19.97%) | 0.1512 (+22.23%) | 0.0955 | 1.18e-05 | 0.2047 (+54.26%) | 0.2268 (+83.35%) | 0.1320 | 4.29e-07 |
| lnL2 | 0.1640 (+28.93%) | 0.1409 (+41.32%)* | 0.1031 | 3.06e-07 | 0.2194 (+72.48%) | 0.2509 (+151.65%) | 0.1471 | 5.78e-07 |
| Tf-ldf | 0.1651 (+30.21%)* | 0.1409 (+32.30%) | 0.1065 | 2.96e-08 | 0.2258 (+78.08%) | 0.2646 (+148.45%) | 0.1512 | 1.77e-07 |

| METHOD | Eclipse | | | | | | | Aspect J | | | | | | |
|---|---|---|---|---|---|---|---|---|---|---|---|---|---|---|
| | MAP | P@1 | P@5 | R@5 | R@10 | H@10 | | MAP | P@1 | P@5 | R@5 | R@10 | H@10 |
| FD | 0.2564 (+24.83%) | 0.2198 | 0.1110 | 0.3199 | 0.4070 | 2,100 | | 0.1410 (+12.89%) | 0.1409 | 0.0832 | 0.1794 | 0.2420 | 124 |
| SD | 0.2466 (+20.06%) | 0.2116 | 0.1069 | 0.3083 | 0.3934 | 2,042 | | 0.1348 (+7.93%) | 0.1340 | 0.0790 | 0.1675 | 0.2382 | 125 |
| FI | 0.2054 | 0.1710 | 0.0883 | 0.2556 | 0.3417 | 1,805 | | 0.1249 | 0.1375 | 0.0708 | 0.1498 | 0.2079 | 111 |

FIG. 18

| METHOD | Eclipse | | | | | | | Aspect J | | | | | | |
|---|---|---|---|---|---|---|---|---|---|---|---|---|---|---|
| | MAP | P@1 | P@5 | R@5 | R@10 | H@10 | | MAP | P@1 | P@5 | R@5 | R@10 | H@10 |
| FD | 0.2778 (+16.87%) | 0.2496 | 0.1201 | 0.3427 | 0.4317 | 2,249 | | 0.1945 (+14.08%) | 0.2131 | 0.0997 | 0.2322 | 0.2996 | 142 |
| SD | 0.2840 (+19.48%) | 0.2543 | 0.1232 | 0.3530 | 0.4391 | 2,268 | | 0.1794 (+5.22%) | 0.1856 | 0.0990 | 0.2203 | 0.3096 | 148 |
| FI | 0.2377 | 0.2020 | 0.1060 | 0.3046 | 0.3859 | 2,044 | | 0.1705 | 0.1856 | 0.0880 | 0.2003 | 0.2693 | 126 |

FIG. 19

| METHOD | Eclipse | | | | | | | Aspect J | | | | | | |
|---|---|---|---|---|---|---|---|---|---|---|---|---|---|---|
| | MAP | P@1 | P@5 | R@5 | R@10 | H@10 | | MAP | P@1 | P@5 | R@5 | R@10 | H@10 |
| FD | 0.3019 (+17.93%) | 0.2696 | 0.1274 | 0.3709 | 0.4640 | 2,386 | | 0.2307 (+8.31%) | 0.2715 | 0.1155 | 0.2703 | 0.3400 | 161 |
| SD | 0.3014 (+17.74%) | 0.2704 | 0.1290 | 0.3749 | 0.4599 | 2,354 | | 0.2263 (+6.24%) | 0.2646 | 0.1148 | 0.2658 | 0.3554 | 167 |
| FI | 0.2560 | 0.2186 | 0.1114 | 0.3263 | 0.4102 | 2,147 | | 0.2130 | 0.2440 | 0.1052 | 0.2438 | 0.3215 | 147 |

BUG LOCALIZATION USING VERSION HISTORY

CROSS-REFERENCE TO RELATED APPLICATIONS

This nonprovisional application claims the benefit of U.S. Provisional Patent Application Ser. No. 61/730,462, filed Nov. 27, 2012 and entitled "Incorporating Version Histories in Information Retrieval Based Bug Localization," the entirety of which is incorporated herein by reference.

TECHNICAL FIELD

The present application relates to information retrieval, and more particularly to searching a corpus for source code artifacts relevant to a query.

BACKGROUND

Software development generally involves programmers' writing textual source code or other software artifacts. The software corresponding to a corpus of source code can exhibit bugs or defects, which are deviations from the specification or expected behaviour of the software (e.g., inaccurate results, unexpected failures, or cosmetic differences from a user-interface specification). Debugging, adjusting the program so that it no longer exhibits those bugs, requires locating the portion(s) of the source code that engender the buggy behaviour.

Fast and accurate localization of software defects continues to be a difficult problem since defects can emanate from a large variety of sources and can often be intricate in nature. It is therefore desirable to provide a search engine that can retrieve software artifacts relevant to a given bug. Examples of software artifacts include source code files and subroutines such as procedures, functions, or methods of objects. Various Information Retrieval (IR) approaches have been proposed towards that end. In IR based bug localization, a query describing some defective behavior of the software is run against the code base in order to rank the software artifacts in the code base with the hope that the highly ranked retrieved artifacts will be those that are likely to have caused the defective behavior.

For example, Ashok et al. (B. Ashok, J. Joy, H. Liang, S. Rajamani, G. Srinivasa, and V. Vangala, "Debugadvisor: a recommender system for debugging," in *Proceedings of the 7th joint meeting of the European software engineering conference and the ACM SIGSOFT symposium on The foundations of software engineering*. ACM, 2009, pp. 373-382) uses relationship graphs to retrieve source files and prior bugs in response to what they refer to as "fat queries" that includes structured and unstructured data.

In an IR based retrieval framework that leverages the prior evolutionary information concerning the development of the software, Kagdi et al. (H. Kagdi, M. Gethers, D. Poshyvanyk, and M. Collard, "Blending conceptual and evolutionary couplings to support change impact analysis in source code," in *Reverse Engineering (WCRE)*, 2010 17th Working Conference on, October 2010, pp. 119-128) describe carrying out change impact analysis by exploiting the conceptual and evolutionary couplings that exist between the different software entities. Nguyen et al. (A. T. Nguyen, T. T. Nguyen, J. Al-Kofahi, H. V. Nguyen, and T. Nguyen, "A topic-based approach for narrowing the search space of buggy files from a bug report," in *Automated Software Engineering (ASE)*, 2011 26th IEEE/ACM International Conference on, November 2011, pp. 263-272) describe BugScout, an automated approach based on Latent Dirichlet Allocation to narrow down the search space while taking into account the defect proneness of the source files.

Reference is made to U.S. Pat. No. 7,685,091, U.S. Pat. No. 8,185,544, and U.S. Pat. No. 8,589,411. Reference is also made to:

S. Rao and A. Kak, "Retrieval from software libraries for bug localization: a comparative study of generic and composite text models," in *Proceeding of the 8th working conference on Mining software repositories*. ACM, 2011, pp. 43-52

T. Zimmermann, P. Weissgerber, S. Diehl, and A. Zeller, "Mining version histories to guide software changes," *IEEE Transactions on Software Engineering*, pp. 429-445, 2005

N. Nagappan, A. Zeller, T. Zimmermann, K. Herzig, and B. Murphy, "Change bursts as defect predictors," in *Software Reliability Engineering (ISSRE)*, 2010 IEEE 21st International Symposium on. Ieee, 2010, pp. 309-318

BRIEF DESCRIPTION

According to an aspect, there is provided a method of searching a corpus including a plurality of files. The method includes automatically performing the following steps using a processor:

determining a respective historical ranking for each file using respective changeset information of that file;

receiving a query including one or more search term(s);

determining a respective textual ranking for each file using the search term(s) and contents of that file; and determining a respective result ranking of each file using the respective historical ranking and the respective textual ranking of that file.

According to another aspect, there is provided a data processing system, comprising:

a storage system storing a corpus including a plurality of files;

a processor configured to automatically:

determine a respective historical ranking for each file in the storage system using respective changeset information of that file;

receive a query including one or more search term(s);

determine a respective textual ranking for each file using the search term(s) and contents of that file;

determine a respective result ranking of each file using the respective historical ranking and the respective textual ranking of that file; and select one or more of the file(s) as query results using the determined result ranking(s) of the file(s); and a user interface system configured to receive query results from the processor and present them to a user.

Various aspects advantageously provide improved searching and ranking of source code documents. Various aspects provide ranked search results to permit readily locating source files or other software artifacts relevant to a given bug.

Various aspects show how version histories of a software project can be used to estimate a prior probability distribution for defect proneness associated with the files in a given version of the project. Subsequently, these priors are used in an IR (Information Retrieval) framework to determine the posterior probability of a file being the cause of a bug. Two models are presented to estimate the priors, one from the defect histories and the other from the modification histories, with both types of histories as stored in the versioning tools. These "base models" can be extended by incorporating a temporal decay into the estimation of the priors. Using the base models without temporal decay, the mean average precision (MAP) for bug localization improves by as much as 30%. When the time decay is factored into the estimates of the priors, the improvements in MAP can be as large as 80%.

Various aspects described herein relate to bug localization; information retrieval; document priors; or software maintenance. Various aspects described herein relate to exploiting spatial code proximity and order for improved source code retrieval for bug localization. Various aspects described herein relate to term proximity, term dependence, information retrieval, markov random fields, or bug localization.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 7 shows experimental data of retrieval performances of various tested exemplary models using MHbP and MHbPd;

FIG. 8 shows experimental data of retrieval performances of various tested exemplary models using DHbP and DHbPd;

FIG. 17 shows experimental data of retrieval accuracy of "title-only" queries using various models according to an example;

FIG. 18 shows experimental data of retrieval accuracy of "title+desc" queries using various models according to an example;

FIG. 19 shows experimental data of retrieval accuracy of "title+desc" queries with Query Conditioning (QC) according to an example;

Figure 1:
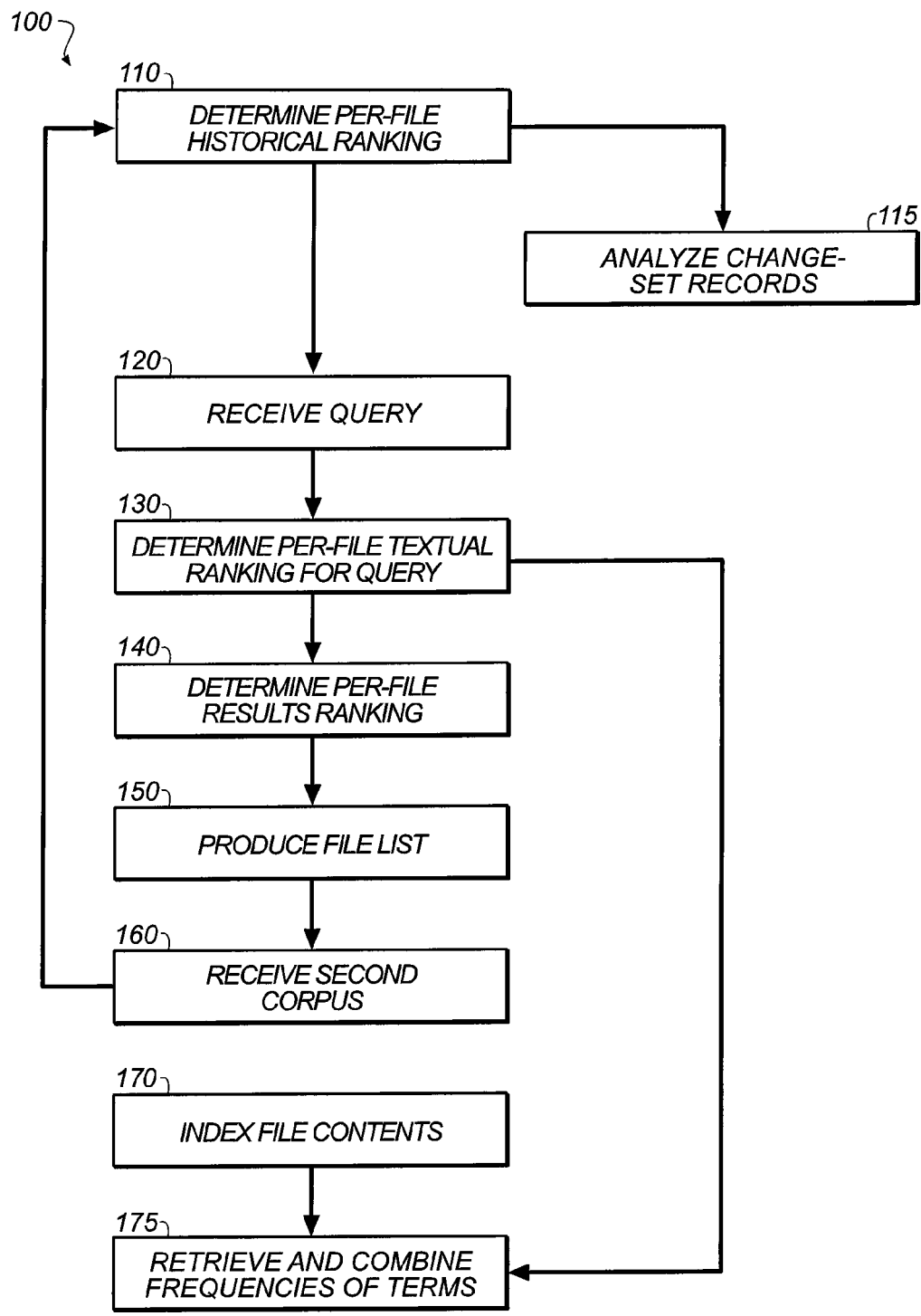
FIG. 1 shows a flowchart illustrating an exemplary method for searching a corpus including a plurality of files.

The attached drawings are for purposes of illustration and are not necessarily to scale.

DETAILED DESCRIPTION

Throughout this description, some aspects are described in terms that would ordinarily be implemented as software programs. Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Herein are described ways of estimating a prior probability distribution for the defect proneness of the files in a given version of a software project. The development history of the files is leveraged while incorporating a temporal decay factor in order to place greater weight on recent maintenance efforts. IR based bug localization accuracy can be significantly improved when such models for the priors are employed in retrieval.

In support of the predictive power of version and modification histories stored in software repositories, various studies have demonstrated that the version histories store information that could potentially be used to predict the future defect likelihoods of the software entities such as files, classes, methods, and so on. Along the same lines, various references describe that prior modification history of software components can be used to guide engineers in future development tasks. Motivated by these and similar other studies, various aspects described herein mine the defect and file modification related knowledge including in the software repositories and incorporate this knowledge in retrieval models for fast and accurate bug localization in large software projects.

With regard to using version histories for bug localization, it is known that defects are often associated with high software modification complexity. Many modifications committed by several programmers during a short period of time can be a strong predictor for future defects. Besides complex prior modification history, the defect histories of the files in a software project is also a good predictor of future defects. A buggy file in the early stages of the project development is likely to produce defects throughout the life cycle of a project unless the project undergoes a fundamental design change.

Prior work on bug localization has been performed through an analysis of either the dynamic or the static properties of software. While dynamic approaches rely on passing and failing executions of a set of test cases to locate the parts of the program causing the bug, static approaches do not require execution of the program and aim at leveraging the static properties or interdependencies to locate bugs. The main deficiency of the dynamic approaches is that designing an exhaustive set of test cases that could effectively be used to reveal defective behaviors is very difficult and expensive. Static properties of a software project as derived from, say, call graphs, on the other hand, tend to be language specific. The static and dynamic approaches also are not able to take into account non-executable files, such as configuration and documentation files, that can also be a source of bugs in modern software.

In comparison with the dynamic and static approaches of the sort mentioned above, the IR based approaches to bug localization may be found preferable in certain software development contexts because they can be used in interactive modes for the refinement of the retrieved results. That is, if a developer is not satisfied with what is retrieved with a current query (because, say, the retrieved set is much too large to be of much use), the developer has the option of reformulating his/her query in order to make the next retrieval more focused. The set of artifacts retrieved in response to the current query can often give clues as to how to reformulate the query for better results the next time. Being able to query the source code flexibly in this manner can only be expected to increase programmers' understanding and knowledge on the software, which can advantageously provide more efficient bug localization.

Herein is presented a framework for estimating the prior defect and modification probabilities of the files in a given version of a project. These prior probabilities can be incorporated into the state of the art retrieval models to improve the bug localization accuracies. An experimental evaluation of the approach is also presented.

Various aspects estimate defect- and modification-based prior probabilities that a given file will be relevant to some bug. These can be computed various ways such as those described below. In general, after a software product is released, further evolution of the software typically takes place in small steps in response to change requests such as those for adding a new feature, modifying an existing feature, bug fixing, and so on. At each step, new files may be added to the code base of the project, or existing files may be removed or altered to implement the requested change. Software Configuration Management (SCM) tools such as SVN create a new revision of the project by incrementally storing these change-sets with every commit operation.

The modifications made to a specific set of files in response to a change request suggest empirical dependencies among the changed files that may not be captured otherwise via dynamic or static properties of the software such as call graphs, APIs or execution traces created by running a set of test cases.

Not all change-sets imply relevant interdependencies among the involved files. For example, the change-sets for what are usually referred to as General Maintenance (GM) tasks tend to be very large. As a case in point, a change-set for removing unnecessary import statements from all Java files in a code base does not carry much useful information with regard to any co-modification dependencies between the files. Change-sets are not used in the models. All non-GM change-sets accumulated during the life cycle of a software project can be regarded as Feature Implementation (FI) change-sets. An FI change-set can be determined to be of type BF (Bug Fixing) if it is specifically committed to implement a bug fix. The common approach to determining whether a change-set is BF is to lexically analyze the commit message associated with it. Those commit messages include key phrases such as "fix for bug" or "fixed bug" etc. Exemplary commit messages such as "fixed illegal forward assignment not caught by 1.0.6" or "fixed bug with unnamed tasks producing messages like [null] Building Zip: foo.zip" are examples of such commit messages.

Those commit messages can include phrases such as "fix for bug #1234," "fixed #1234," etc. One drawback of this approach is that it is not uncommon for programmers to not include the bug number in the commit messages; this could cause a significant fraction of the BF change-sets to go unnoticed. To overcome this problem, change-sets with commit messages containing phrases such as "fix for bug" and "fixed bug" without an actual bug number can be considered as being of type BF.

Over the years, researchers have proposed several process and product related metrics to predict the defect potential of software components in order to help the software managers make smarter decisions as to where to focus their resources. Several studies have shown that bug prediction approaches based on process metrics outperform the approaches that use product metrics. Along the same lines, FI and BF change-sets can be used to compute the modification and the defect probabilities respectively.

FIG. 1 shows a flowchart illustrating an exemplary method 100 for searching a corpus including a plurality of files. The corpus can include a source-code repository such as a Concurrent Versions System (CVS) repository. The term "file" refers generally to any collection of data that has a specific identity as a collection. For example, a source code file is a collection of words (the source text) identified with a filename (the identity). The steps of method 100 can be performed in any order except when otherwise specified, or when data from an earlier step is used in a later step. In at least one example, processing begins with step 110 or step 170. For clarity of explanation, reference is herein made to various components or features shown in FIGS. 2-22, and to various equations herein, that can carry out or participate in, or are employed in, the steps of the exemplary method 100. It should be noted, however, that other components and equations can be used; that is, exemplary method(s) shown in FIG. 1 are not limited to being carried out by the identified components or equations. In various aspects, the steps of method 100 are automatically performing using processor 286, FIG. 2. In various aspects, the steps are performed in the following order: 170, 110, 115, 120, 130, 175, 140, 150.

In step 110, a respective historical ranking (e.g., P(f|C)) is determined for each file using respective changeset information (e.g., $I_m$, $I_b$) of that file. This can be as described below with reference to Eqs. 1, 3, 5, or 6. For example, step 110 can include computing a ranking weight (e.g., the exponential term in Eq. 5) for each file using a duration between a selected reference time ($t_k$) and a last-modification time ($t_i$) of the file. The last-modification time can include a time, date, or timestamp (e.g., seconds since Jan. 1, 1970). In various aspects, the determined historical rankings are normalized with respect to the plurality of files in the corpus. This can be accomplished by the division in Eq. 5, in which the numerator sums over all changesets of a given file, and the denominator sums over all changesets of all files. Step 110 can be followed by step 120.

In various aspects, step 110 includes step 115 of analyzing the changeset records. In these aspects, the changeset information includes a plurality of changeset records. Each changeset record includes respective contents (e.g., a log message) and a respective list of files corresponding to that changeset record. Step 115 includes determining a respective ranking contribution for each file and each changeset record, e.g., as described below with reference to Eq. 2. The respective ranking contributions for the changeset records corresponding to each file are then combined to provide the historical ranking for that file, e.g., as in the numerator of Eq. 1. The step of determining the ranking contribution can further include automatically determining a type of each changeset record, e.g., BF or FI, using the contents of that changeset record. This can be done using regular expressions, as discussed below. The respective ranking contribution is then determined based on the determined type (e.g., the test $r_i \in$ FI in Eq. 2).

The step of determining the respective ranking contribution can also or alternatively include computing a ranking weight (e.g., the exponential term in Eqs. 5 or 6) for each changeset record (i) using a duration between a selected reference time ($t_k$) and a commit time ($t_i$) of the changeset record. Commit times can include times, dates, or timestamps, as discussed above with reference to the last-modification times of files. Commit times can also be serial numbers of commits, e.g., as assigned in the Subversion (svn) version-control system, or other interval variables having a value per changeset.

In step 120, a query is received. The query includes one or more search term(s). In an example, the query includes a bug report of the title of a bug report.

In step 130, a respective textual ranking (e.g., P(B|f)) is determined for each file using the search term(s) and the contents of that file. This can be as described below with reference to Eq. 7. Step 130 can be followed by step 140 and can include step 175.

In step 140, a respective result ranking (e.g., P(f|B, R, C)) is determined for each file using the respective historical ranking and the respective textual ranking of that file.

In various aspects, step 150 includes producing a list of a selected number of the files having the highest respective result rankings. For example, the files with the highest ranking can be presented on a display (e.g., user interface system 230, FIG. 2). The results can be presented in sorted order, e.g., from highest-ranked to lowest-ranked, or in other orders.

In various aspects, step 170 includes automatically preparing an index of the contents of the files using the processor. In these examples, step 130 of determining the respective textual ranking includes step 175. In step 175, which follows step 170, respective term frequency(ies) in the respective file are retrieved from the index for one or more of the search term(s). This can include automatically tokenizing the contents of each file according to a type of the file, as discussed below. The retrieved respective term frequency(ies) are then combined, e.g., as discussed below with reference to Eq. 10.

In various aspects, a new corpus is prepared for each bug. This is because a bug may only be present in one specific set of source files. (Changes to source files can sometimes introduce or fix bugs related to the combinations of those files with other files.) Specifically, in step 160, a second corpus is received including a second plurality of files. Step 110 or step 170 is next. In this way, the preparing step 170, the determining-historical-ranking step 110, the receiving step 120, the determining-textual-ranking step 130, and the determining-result-ranking step 140 are repeated using the second plurality of files.

In view of the foregoing, various aspects provide analysis of source code files to locate files likely relevant to a given bug. A technical effect is to provide a visual indication, e.g., on a display, of the retrieved files, e.g., in ranked order.

The $k^{th}$ change-set of a software project is denoted by $r_k$; this represents the set of the modified files in response to the $k^{th}$ change request for k=1 ... K during software development or maintenance. After the $k^{th}$ commit, with some files having being altered, a new collection of files $C_k$ is created. If $C_k$ exhibits defective behavior, the defect and the modification probabilities of the files in $C_k$ can be modeled by a multinomial distribution. (The multinomial distribution and the categorical distribution are used exchangeably in the IR community. Here tradition is adhered to.) In the multinomial distribution, $P(f|C_k)$ represents the probability of a file f to be responsible for the defective behavior reported. $\Sigma_{f \in C_k} P(f|C_k)=1$. The probability associated with a file can be independent of the rest of the files in the collection. This is referred to herein as the "bag of files" assumption.

Herein, two base models are proposed that determine from the version histories the prior (query-independent) defect and modification probabilities associated with the files in a software project. These are referred to herein as Modification History based Prior (MHbP) and Defect History based Prior (DHbP). These models can be extended by incorporating in them a time decay factor. The suffix 'd' added to the acronyms of the base models indicates the decay-based versions of the two models: MHbPd and DHbPd respectively. Table 1 summarizes the notation used in these models.

TABLE 1

The Notation Used

| | |
|---|---|
| K | Total number of change-sets |
| $C_k$ | The collection of the software files after the $k^{th}$ commit |
| $R_k$ | The set of change-sets up to and including the $k^{th}$ change-set |
| $\beta_1$ | The decay parameter for modification probabilities |
| $\beta_2$ | The decay parameter for defect probabilities |

Several authors have established that the modification history of a file is a good predictor of its fault potential. Hassan used the code change complexity to estimate the defect potential of the files on the basis of the rationale that as the number of modifications to the files increases, the defect potential of the files can also increase. It has also been shown that the change bursts during certain periods of software development are good indicators of future defects. The main intuition behind their approach is that implementing many changes in a short period of time complicates the development process, leading to defects.

With the MHbP model, the frequencies with which the files are mentioned in the change records can be translated into file modification probabilities. Using Maximum Likelihood (ML) estimation, the modification probability of a file f in a given collection $C_k$ can be expressed as $$P_{MHbP}(f|C_k, R_k) = \frac{\sum_{i=1}^{k} I_m(f, r_i)}{\sum_{f' \in C_k} \sum_{i=1}^{k} I_m(f', r_i)} \quad (1)$$

where $$I_m(f, r_i) = \begin{cases} 1, & f \in r_i \ \& \ r_i \in FI \\ 0, & \text{otherwise.} \end{cases} \quad (2)$$

In the formulation, $R_k$ represents the set of change-sets from the beginning of the development to the $k^{th}$ change-set; $R_K$=FI∪GM. The model assigns bigger probability mass to the files modified more frequently with $\Sigma_{f \in C_k} P_{MHbP}(f|C_k, R_k)=1$.

Bug fixing change-sets mark the defect producing files during the life cycle of a project. The files mentioned in these change-sets are highly likely to produce bugs in the future as the buggy files tend to remain buggy Similar to the MHbP model, the defect probability of a file can be estimated as:

$$P_{DHbP}(f|C_k, R_k) = \frac{\sum_{i=1}^{k} I_b(f, r_i)}{\sum_{f' \in C_k} \sum_{i=1}^{k} I_b(f', r_i)} \quad (3)$$

where $$I_b(f, r_i) = \begin{cases} 1, & f \in r_i \ \& \ r_i \in BF \\ 0, & \text{otherwise.} \end{cases} \quad (4)$$

$I_b(f, r_i)$ is an indicator variable that becomes unity (1) if $r_i$ implements a bug fix that results in a modification in f. This probability gives the ML estimate for the defect probabilities of the files.

Various aspects model priors with temporal decay. After a change request is implemented, it takes time for the files to stabilize and become bug-free. Indeed, implementing certain change requests may even take more than one commit operation perhaps from several developers. After the files have been stabilized, the modification probabilities can decrease. Therefore, even if a file had been modified frequently during a certain period of time in the past, if it has not been modified recently, the modification probability should decrease A time decay factor is incorporated into the formulation of the modification probabilities to take that facet of software development into account as follows:

$$P_{MHbPd}(f|C_k, R_k) = \frac{\sum_{i=1}^{k} e^{\frac{1}{\beta_1}(t_i-t_k)} I_m(f, r_i)}{\sum_{f' \in C_k} \sum_{i=1}^{k} e^{\frac{1}{\beta_1}(t_i-t_k)} I_m(f', r_i)} \quad (5)$$

where $t_i$ represents the time at which the $i^{th}$ change-set was committed. This type of decay models has been used commonly in the past. The parameter $\beta_1$ governs the amount of decay and it is related to the expected time for the files to stabilize with the implementation of a change request. As $\beta_1$ decreases, the amount of decay increases and therefore the expected stabilization time decreases.

Similar to the MHbPd model, recency of the bugs is an important factor in estimating the defect probabilities. A time decay factor can be incorporated into the defect probabilities to emphasize the recent bug fixes in the estimation of prior defect probabilities as follows:

$$P_{DHbPd}(f|C_k, R_k) = \frac{\sum_{i=1}^{k} e^{\frac{1}{\beta_2}(t_i-t_k)} I_b(f, r_i)}{\sum_{f' \in C_k} \sum_{i=1}^{k} e^{\frac{1}{\beta_2}(t_i-t_k)} I_b(f', r_i)}. \quad (6)$$

Various aspects use a document retrieval model. Specifically, it is desirable to score the files in the code base of a software project in order to rank them according to their relevance to a given bug. This advantageously permits programmers to rapidly locate source files to be modified to fix a given bug, increasing the efficiency of the software-development process. The models presented above estimate the prior probability of a file to be defective. That prior probability can be incorporated into the bug localization process to increase retrieval accuracy.

In the context of using document priors in a probabilistic retrieval framework, Language Modeling (LM) and Divergence From Randomness (DFR) are two approaches to text retrieval that have been shown to produce effective empirical results. While LM presents a probabilistic approach in the Bayesian framework, DFR is an approach that evaluates the appropriateness of a document to a query on the basis of the divergence of document feature probabilities from pure non-discriminative random distributions.

In the Bayesian framework, given the description of a bug B as a query, the posterior probability that a file f pertains to the defective behavior is computed by $$P(f|B, R_k, C_k) = \frac{P(B|f, C_k) P(f|R_k, C_k)}{P(B)}. \quad (7)$$

In various aspects, only the file rankings are relevant. Therefore, since the denominator in Eq. 7 does not depend on the files, that denominator can be ignored. Taking the logarithm for computational convenience, the final score of a file being relevant to a given bug with the prior belief is computed as:

$$s_{LM}(f|B,R_k,C_k) = \log_2[P(B|f,C_k)] + \log_2[P(f|R_k,C_k)] \quad (8)$$

The $P(B|f,C_k)$ term in the numerator is a textual ranking, and can be computed as discussed below with reference to Eq. 10. The textual ranking for a given query on a given file is computed using the query string and the contents of the file. The $P(f|R_k, C_l)$ term in the numerator is a historical ranking, and is computed as described above, e.g., using the MHbP, DHbP, MHbPd, or DHbPd models (Eqs. 1, 3, 5, and 6 respectively).

In the DFR framework, the final score of a file in response to a query is altered to take the prior belief into account as follows:

$$s_{DFR}(f|B,R_k,C_k) = s_{DFR}(f|B,C_k) + \log_2[P(f|R_k,C_k)] \quad (9)$$

As described above, $P(f|R_k, C_k)$ can be estimated. Below is described the estimation of $P(B|f, C_k)$ in an LM retrieval framework and the estimation of $s_{DFR}(f|B, C_k)$ in a DFR retrieval framework.

The language modeling approach uses the notion of query likelihood which ranks the documents in a collection according to the likelihood of relevance to the query. Given a bug B as a query, in order to compute the posterior defect probability of a file f, $P(B|f)$ is computed.

The terms in the query, as well as in the documents, are regarded as occurring independently of one another (this being the bag of words assumption), therefore:

$$P(B|f) = \prod_{w \in B} P(w|f) \quad (10)$$

where $P(w|f)$ is the likelihood of a bug term w in f and it is computed with ML estimation. Given a term w from the vocabulary V of the collection C, the ML estimate sought is given by $P_{ML}(w|f)=tf(w,f)/\Sigma_{w' \in f}tf(w', f)$ where $tf(w, f)$ is the term frequency of w in $f \in C$.

Scoring the set of files in this way is problematic as all the query terms may not be present in a given document, leading to zero probabilities. To overcome this problem, several smoothing techniques have been proposed over the years. Using the collection model for smoothing, a Hiemstra Language Model (HLM) computes the file likelihood of a term as follows:

$$P_{HLM}(w|f) = \lambda \cdot P_{ML}(w|f) + (1-\lambda) \cdot P_{ML}(w|C) \quad (11)$$

where $P_{ML}(w|C)$ is the collection likelihood of the term and it is given by $P(w|C)=tf(w, C)/\Sigma_{w' \in V}tf(w', C)$ where $tf(w, C)$ represents the term frequency of w in the collection. The parameter $\lambda$ is called the mixture variable and governs the amount of smoothing.

Another powerful smoothing approach is the Bayesian Smoothing with Dirichlet Priors. If the Dirichlet parameters are chosen as $\mu P(w|C)$ for each term $w \in V$ then the file likelihood of a term is given by $$P_{DLM}(w|f) = \frac{tf(w,f) + \mu P(w|C)}{\sum_{w' \in f} tf(w',f) + \mu} \quad (12)$$

where $\mu$ is the smoothing parameter. This model is denoted by DLM (Dirichlet Language Model).

A known approach to document retrieval in probabilistic frameworks is the Divergence from Randomness (DFR) based approach. As mentioned earlier, DFR is an approach that evaluates the appropriateness of a document to a query on the divergence of document feature probabilities from pure non-discriminative random distributions. The core idea in DFR is that the terms that do not help discriminate the documents in a collection are distributed randomly while the discriminative terms tend to appear densely only in a small set of elite documents. A document is regarded as an elite document for a term if the term appears at least once in the document. These content bearing terms or the specialty terms should not follow a random distribution and the amount of divergence from randomness determines the discriminatory power of the term for retrieval. The higher the divergence, the higher the importance of the term in the retrieval. The DFR framework permits avoiding parameter tuning to a great extent since the models are non-parametric.

In this framework, the score of a document with respect to a single query term is given by the product of two information content:

$$s_{DFR}(w,f) = [1 - \text{Prob}_2(w,f)] \cdot [-\log_2 \text{Prob}_1(w,f)]. \quad (13)$$

$\text{Prob}_1$ is the probability of having tf occurrences of the term in the document by pure chance and as this probability decreases, the information content $-\log_2 \text{Prob}_i$ of the document vis-a-vis the term increases. $(1-\text{Prob}_2)$, on the other hand, is related to the risk of choosing the query term as a discriminative term and works as a normalization factor. Using different probability distributions in these two information contents results in different retrieval models.

Similar to the LM, the models presented from DFR also use the bag of words assumption. Therefore the score of a document with respect to a query is given by $$s_{DFR}(f|B) = \sum_{w \in B} s_{DFR}(w, f). \quad (14)$$

"Tf-Idf" stands for Term Frequency-Inverse Document Frequency Assuming that the terms are being distributed in the documents randomly, having tf occurrences of a term in a document by pure chance is given by $\text{Prob}_1 = p^{tf}$ where p is the probability of a term to appear in any document. In order to compute the posterior distribution for p, usually a beta prior with parameters $\alpha_1 = -0.5$ and $\alpha_2 = -0.5$ is assumed. The evidence in computing p is given by the probability of the term to land in E elite documents out of N documents in a collection, which can be modeled by a binomial distribution $$P(E|p, N) = \binom{N}{E} p^E \cdot (1-p)^{N-E}.$$

In this case, the posterior will also be in the form of the beta distribution and the expected value of p is given by $(E+0.5)/(N+1)$. Therefore, $$-\log_2 \text{Prob}_1 = tf \cdot \log_2 \frac{N+1}{E+0.5}. \quad (15)$$

This information content is denoted by "In" (Inverse document frequency).

Using the expected number of elite documents $E_e$ instead of E in the formula above results in a separate model "InExp" where $E_e = N \cdot P(tf \neq 0)$. If the probability of a term appearing in a document out of N documents is given by $1/N$, then $$P(tf \neq 0) = 1 - \left(\frac{N-1}{N}\right)^{TF}$$

where TF is the total number of occurrences of the term in the collection.

$\text{Prob}_1$ by itself is not sufficient to accurately discriminate specialty terms since the terms with high frequencies will always produce small $\text{Prob}_1$ and thus become dominating during retrieval. To normalize the information content, two main methods have been proposed Normalization "L" estimates the probability of having one more token of the same term in the document by $\text{Prob}_2 = tf/(tf+1)$. ("L" stands for Laplace as this probability is given by so-called Laplace's law of succession.) Normalization "B," on the other hand, assumes a new token of the same term added to the collection which already has TF tokens of the term. With this new token, the probability of having tf+1 occurrences of the term in a document can be estimated by the binomial probability $$Binom(E, TF+1, tf+1) = \binom{TF+1}{tf+1} p^{tf} \cdot q^{TF-tf}$$

where p=1/E and q=1−p. Then the incremental rate between Binom(E,TF,tf) and Binom(E,TF+1,tf+1) gives the normalization factor:

$$Prob_2 = 1 - \frac{Binom(E, TF+1, tf+1)}{Binom(E, TF, tf)}. \quad (16)$$

Document length is another important factor in retrieval. It has been shown that the relevancy of a document to a query is dependent on the document length Normalization 2 as proposed in uses the assumption that the term frequency density in a document is a decreasing function of the document length. If the effective document length is chosen as the average document length in the collection, then the normalized term frequency is given by $$tfn = tf \cdot \log_2\left(1 + \frac{avg\_l}{l}\right) \quad (17)$$

where l is the length of the document and avg_l is the average document length in the collection. Instead of the regular tf, tfn is used in the computation of $Prob_1$ and $Prob_2$.

Another set of widely used retrieval algorithms are grouped under the TF-IDF scheme. This approach is presented in the DFR framework as the structures of the scoring functions are the same. In this class of retrieval models, the score of a document with respect to a single query term is given by the multiplication of the term frequency with the inverse document frequency. One algorithm that produced effective empirical results in performed experiments uses Robertson's tf which is given by $$a_1 \cdot \frac{tf}{(tf + a_1 \cdot (1 - a_2 + a_2 \cdot l/avg\_l))} \quad (18)$$

and Spark Jones' Idf which is given by $$\log_2\left(\frac{N}{E+1}\right).$$

The parameters $a_1$ and $a_2$ in Robertson's tf provide non-linearity to the term frequencies for scoring the documents.

Table 2 summarizes various models explained herein.

TABLE 2

| Retrieval Models | |
|---|---|
| Language Models | |
| HLM | Hiemstra Language Model |
| DLM | Dirichlet Language Model |

TABLE 2-continued

| Retrieval Models | |
|---|---|
| Divergence from Randomness | |
| InB2 | Inverse Document Frequency + Normalization B + Normalization 2 |
| InExpB2 | Inverse Document Frequency with expected number of elite documents + Normalization B + Normalization 2 |
| InL2 | Inverse Document Frequency + Normalization L + Normalization 2 |
| Tf-Idf | Robertson's tf + Sparck Jones' Idf |

In order to evaluate the proposed algorithms, a complete repository of a software project with a set of documented bug descriptions Q is preferably used. Unfortunately, software repositories and bug tracking databases are usually maintained separately. Therefore, in general, it may not be known which change-sets in the repository are committed for implementing the fixes for bugs. One approach that has been used to get around this limitation is to look for pointers in the commit messages to the bug tracking database. The iBugs dataset created by Dallmeier and Zimmerman uses this approach and it is therefore an appropriate testbed for experiments described herein.

The bug localization performance of various aspects can be seen with respect to AspectJ, an aspect-oriented extension to the Java programming language. The iBugs dataset for AspectJ contains a set of reported bugs, the collection of the files before and after a fix was implemented for each bug, and the files modified to implement the fix. One can use the pre-fix versions of the project as the corpora for retrieval experiments described herein.

Besides the iBugs dataset, the complete CVS repository of the AspectJ project can be used for evaluation. This repository is publicly available. CVS repositories do not record the change-sets. Accordingly, the change-sets were reconstructed by grouping the files that are committed by the same author (e.g., programmer) with the same commit message using a time fuzziness of 300 seconds. Table 3 gives various properties of the AspectJ project.

TABLE 3

| AspectJ Project Properties | | | | |
|---|---|---|---|---|
| K | \|F\| | \|BF\| | \|Q\| | Analysis Period |
| 6,271 | 5,165 | 1,214 | 291 | 2001-01-16-2008-10-06 |

Since the code base of a software project keeps changing during development, in general, there can be significant differences in the underlying code base for any two bugs. In order to keep track of the changes in the code base, a distinct index is created for each collection that a bug B∈Q was reported on. For example, a snapshot of the project (or an appropriate branch or release) can be taken as of the reporting time of the bug, and that snapshot searched for relevant files. For indexing the source code and performing retrieval, open-source or commercial tools such as TERRIER can be used or extended.

Figure 3:
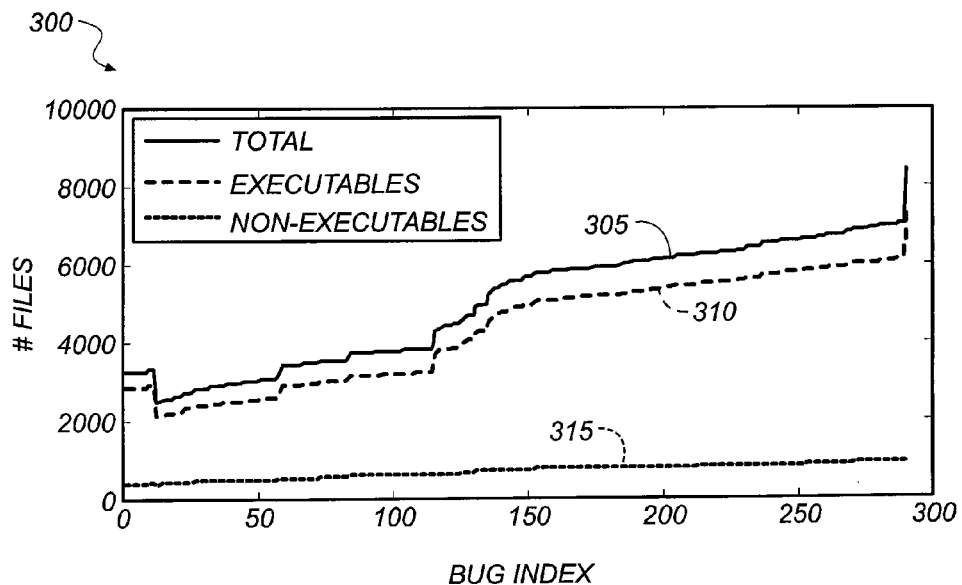
FIG. 3 plots the size of the AspectJ software project over time.

FIG. 3 shows the size of the AspectJ project as a function of the time of the bug report for each bug B∈Q. Modern software projects tend to include a substantial number of non-executable files such as configuration files, documentation files, help files, and so on. Therefore finding only the executable files may not constitute a complete answer to the bug localization problem. XML files, for example, are used heavily in project configuration and it may be necessary to make modifications to these files to fix certain bugs. Files with the extensions ".java" and ".aj" are considered executable. The rest of the files in the code base that may also cause defective behavior are regarded as non-executable. FIG. 3 depicts the evolving size of the AspectJ project during the bug reporting period. On average, the non-executable files (trace 315) constitute 13.58% of the source code (total, trace 305; the remainder are executables, trace 310). It is important to note these different types of files have different characteristics. So, as described below, they are subject to slightly different tokenization procedures.

In various aspects, treating each source-code file as a bag of words, an initial stopword list is first to remove the programming-language-specific tokens such as public, private, and transient from the executable files. Then the compound terms that use camel-case and punctuation characters are split (e.g., niklaus_wirth is split to "niklaus" and "wirth", as is NiklausWirth). After these steps, an English stopword list is applied to remove noise terms such as "a," "an," and "the." Porter's (or another) stemming algorithm is then applied to reduce the terms to their root forms. The terms obtained through this process are then lowercased and incorporated in the index. The non-executable files, also considered to be a bag of words, are not subject to the programming-language-specific stop list. However, the compound tokens in such files are split also.

Figure 4:
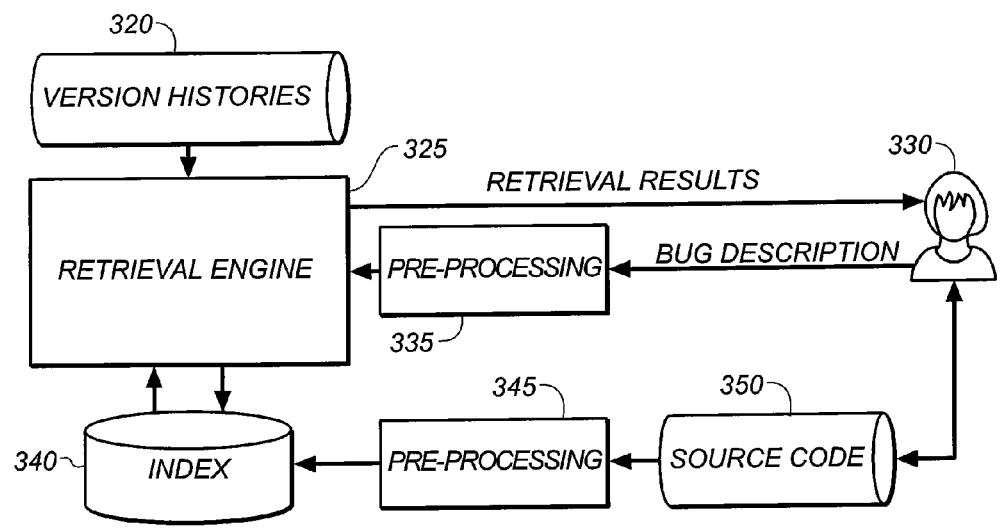
FIG. 4 is a dataflow diagram of bug localization processes according to various aspects.

FIG. 4 is a dataflow diagram of bug localization processes according to various aspects. Typically, a bug report or bug description from a user 330 (e.g., a programmer, tester, or end user) is written in ordinary English and it may include tokens from the code base 350. For example, a bug report may include the trace of an exception caused to be thrown by the bug, or it may include method names that are possibly related to the defective behavior.

The same preprocessing steps are applied to the bug reports (at block 335) as for the non-executables (at block 345) in the code base 350. For example, compound-term splitting can be carried out and stopping and stemming rules can be used to prune the reports. Bug reports that have no associated files in the code base can also be dropped. After this preprocessing, in one simulation, 291 bug reports and 1124 files associated with them were located, or 3.86 files per bug on average. The results of preprocessing (blocks 335, 345) can be stored in index 340. Index 340 and version histories 320 (e.g., changeset data) are used by retrieval engine 325 (e.g., including a processor 286 or other components shown in FIG. 2) to provide retrieval results to user 330.

The accuracy of search engines is commonly measured by precision and recall metrics. In an example, there are four relevant files in the collection to be retrieved by the search engine in response to a query. If three of the top T=10 retrieved files in the ranked list are relevant then the precision would be calculated as 3/10 and the recall as 3/4. A high precision indicates that a large fraction of the retrieved set is relevant. Recall, on the other hand, measures the completeness of the results.

The retrieval performance has been tabulated using mean precision at rank t (P@t), mean recall at rank t (R@t) and Mean Average Precision (MAP) metrics. The average precision (AveP) for a query B∈Q is given by $$AveP(B) = \frac{\sum_{t=1}^{T} P@t \times I(t)}{rel_B}, \quad (19)$$

where I(t) is a binary function whose value is 1 when the file at rank t is a relevant file, and 0 otherwise. $rel_B$ is the total number of relevant files in the collection for B. MAP is computed by taking the mean of the average precisions for all the queries.

Figure 5:
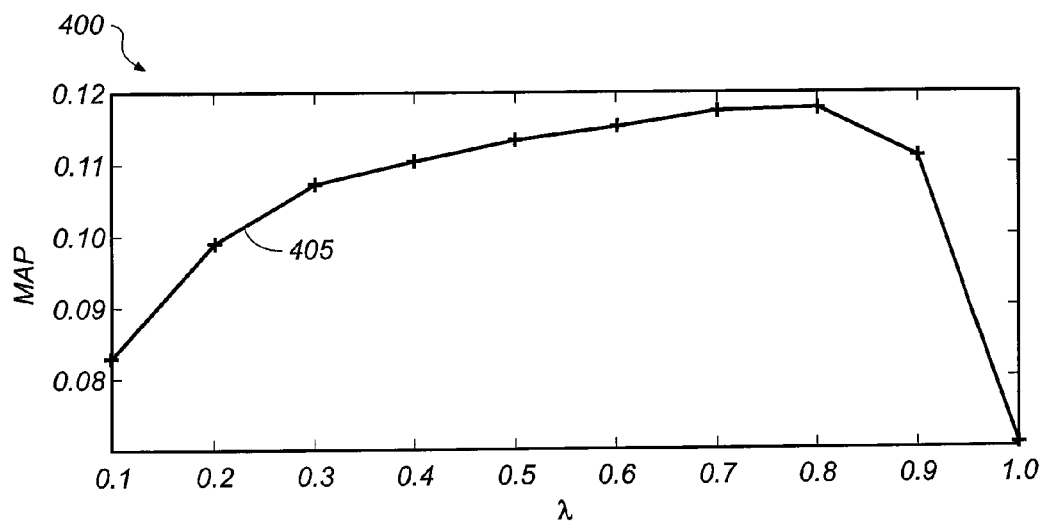
FIG. 5 shows experimental data of effects of parameter variation in a Hiemstra Language Model according to an example.
Figure 6:
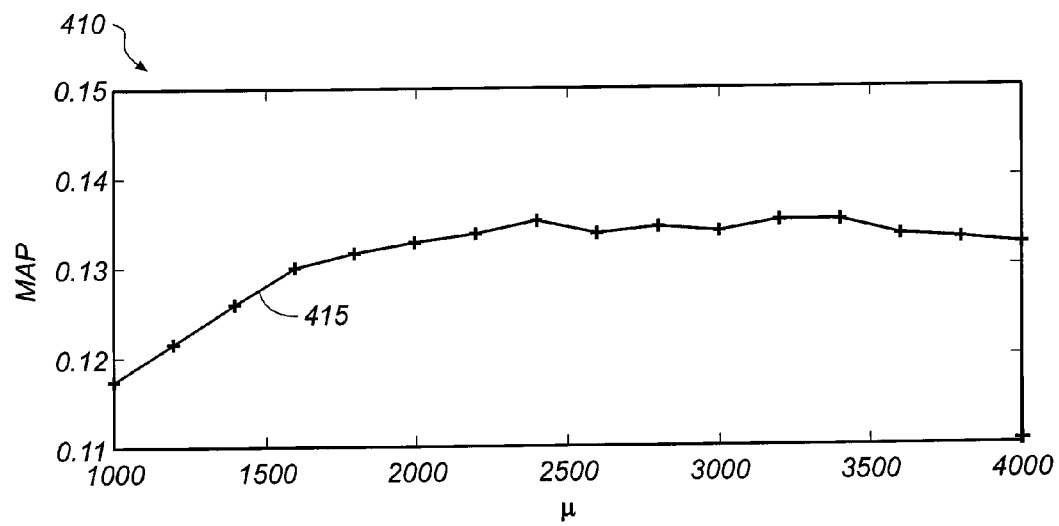
FIG. 6 shows experimental data of effects of parameter variation in a Dirichlet Language Model according to an example.

FIGS. 5 and 6 show experimental data. FIG. 5 shows experimental data trace 405 of the effect on MAP of varying λ in HLM. FIG. 6 shows experimental data trace 415 of the effect of varying μ in DLM.

The parameters λ for HLM and μ for DLM shown in FIGS. 5 and 6 can be tuned according to the characteristic of the underlying collection. FIGS. 5 and 6 plot the retrieval accuracies in terms of MAP for various values of these parameters. For retrievals with HLM, high baseline accuracy can be obtained with λ=0.8 which assigns a higher weight to the file likelihoods as compared to the collection likelihoods of the query terms. On the other hand, the optimum value of μ for DLM is 2400, although the accuracies are not very sensitive to the variations in the [2000-4000] interval. The constants $a_1$ and $a_2$ in the Tf-Idf model are set to 1.2 and 1.0 respectively. In all of the experiments with DLM, HLM and Tf-Idf, these fixed values for the parameters are used to solely compare the improvements with the proposed defect and modification based models for the priors.

Table 4 presents the baseline retrieval performance across the models without incorporating the defect or the modification probabilities. That is, an assumption is made of a uniform prior for the results in Table 4. DLM performs better than HLM in this example. The models InB2, InExpB2 and InL2 from the DFR framework do not require parameter tuning while performing as well as and sometimes better than the models in LM.

TABLE 4

| Baseline Retrieval Results | | | | |
|---|---|---|---|---|
| Model | MAP | P@1 | P@5 | R@5 |
| HLM (λ = 0.8) | 0.1174 | 0.0859 | 0.0715 | 0.1607 |
| DLM (μ = 2400) | 0.1349 | 0.1271 | 0.0851 | 0.1642 |
| InB2 | 0.1240 | 0.1233 | 0.0774 | 0.1491 |
| InExpB2 | 0.1327 | 0.1237 | 0.0735 | 0.1485 |
| InL2 | 0.1268 | 0.0993 | 0.0719 | 0.1555 |
| Tf-Idf ($a_1$ = 1.2, $a_2$ = 1.0) | 0.1264 | 0.1062 | 0.0712 | 0.1488 |

Table 5 presents various statistical hypotheses that can be used to investigate the effect of using the defect and modification priors on the retrieval of the files likely to be defective. The retrieval performance results are presented in FIGS. 7 and 8.

TABLE 5

| | Statistical hypotheses |
|---|---|
| H1 | Using the prior modification probabilities of the files (MHbP) in a software project enhances the bug localization accuracy. |
| H2 | Using the prior defect probabilities of the files (DHbP) in a software project enhances the bug localization accuracy. |

TABLE 5-continued

Statistical hypotheses

| | |
|---|---|
| H1a | MHbPd outperforms MHbP when they are employed in IR based bug localization. |
| H2a | DHbPd outperforms DHbP when they are employed in IR based bug localization. |
| H3 | Prior defect history is superior to prior modification history when they are employed in IR based bug localization. |

FIG. 7 shows retrieval performances across various tested models using MHbP and MHbPd. FIG. 8 shows retrieval performances across various tested models with DHbP and DHbPd. In these figures, the pairwise student's t-test is used for significance testing. The columns p-H1, p-H1a, p-H2 and p-H2a show the computed p-value of the pairwise significance tests for the corresponding hypotheses. The highest score in each column is given in bold. Improvement percentages for MAP and P@1 compared to the baseline results can be reported. Highest improvement in each column is designated by the '*' character.

The observed improvements in the retrieval results are statistically significant at a significance level of 1% i.e. $\alpha=0.01$, therefore the null hypotheses for H1, H1a, H2 and H2a are rejected. As can be seen in FIGS. 7 and 8, using the defect or the modification priors estimated from the version histories improves the bug localization accuracies significantly. Especially the amount of improvement in precision is extremely high with highest improvement being 156% in P@1 for the HLM model incorporating DHbPd.

The InL2 model from the DFR framework stands out in the experiments. This model does not need any parameter tuning and it performs comparably well, gaining the highest improvements in P@1 with MHbP, MHbPd and DHbP, and second to the highest improvement in P@1 with DHbPd. With a MAP value of 0.2258, the highest-tested retrieval accuracy is obtained with the Tf-Idf model incorporating DHbPd. The InL2 model incorporating DHbPd came out as the second best with a MAP of 0.2194.

BF change-sets can be more descriptive than FI changesets in terms of the defect potential for the files. In simulations performed comparing the models using the prior defect history with the models using the prior modification history, DHbP outperforms MHbP at a significance level of 1% i.e. $\alpha=0.01$ for all the models except DLM for which the p-value is 0.026, indicating a significance level of 5%. Accordingly, in various aspects, using the defect histories of the files results in improved bug localization in comparison to the modification histories. Therefore, the null hypothesis for H3 is rejected in the tested scenario.

It is reasonable to assume that the effects of modification and bug-occurrence events associated with a file should decay with time. As developers fix the faulty parts of a software project in response to the reported bugs, some files may have caused the bugs to occur on just a one-off basis, while others may require repeated fixes for the same set of bugs. Accordingly, the weight given to a file in relation to a given bug with just a one-off occurrence of the bug that was fixed a long time ago can be low and this weight should become even lower with the passage of time. On the other hand, a file requiring repeated fixes for a bug should get a higher weight as being a likely source of the same bug again and this weight should diminish only slowly with time.

Figure 9:
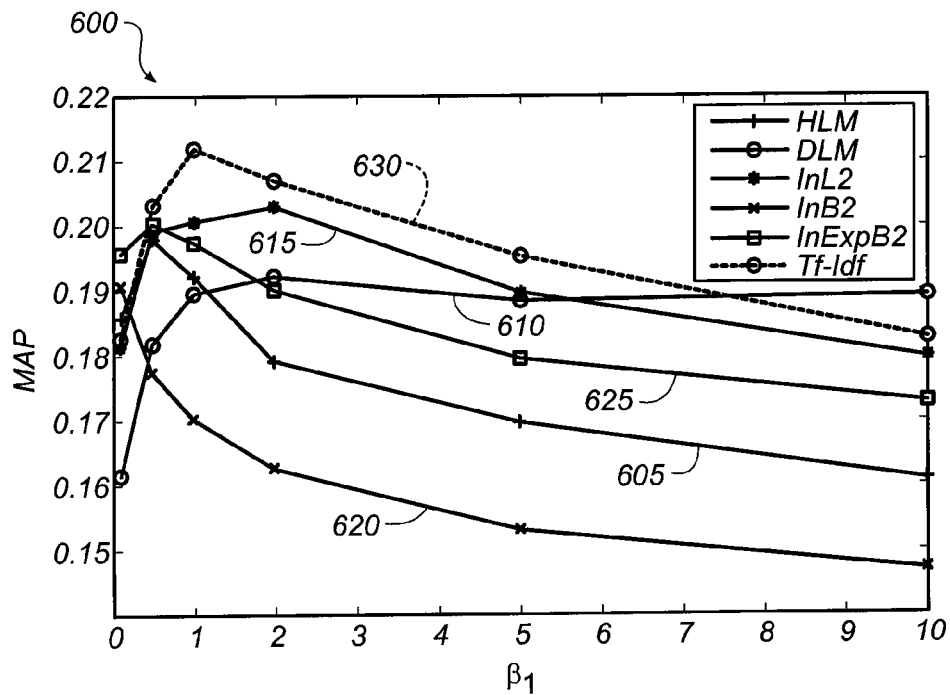
FIG. 9 shows experimental data of effects of parameter variation in an MHbPd model according to an example.
Figure 10:
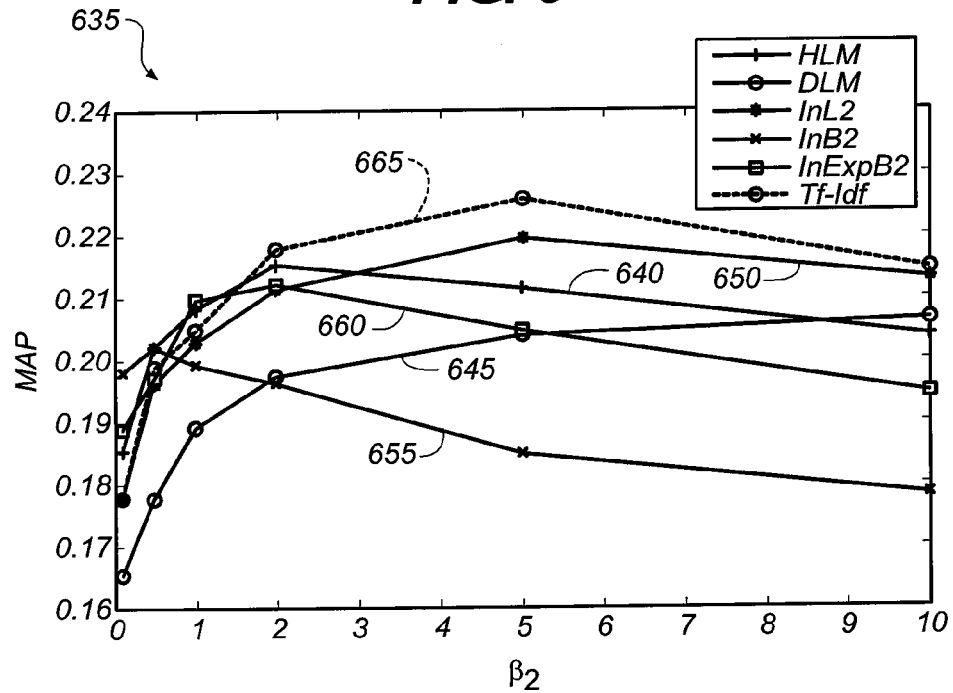
FIG. 10 shows experimental data of effects of parameter variation in a DHbPd model according to an example.

FIG. 9 shows experimental data of the effect of varying $\beta_1$ in MHbPd. FIG. 10 shows experimental data of the effect of varying $\beta_2$ in DHbPd. In various aspects, time decay is incorporated through the parameters $\beta_1$ and $\beta_2$. FIGS. 9 and 10 plot the retrieval accuracies for several different values of these parameters. Retrieval with the Tf-Idf model performed the best in this example with $\beta_1=1.0$ and $\beta_2=5.0$. Results for various models are shown, as indicated in Table 6. The models are described above with reference to Table 2.

TABLE 6

Data shown in FIGS. 9 and 10

| Model | FIG. 9 | FIG. 9 |
|---|---|---|
| DLM | trace 610 | trace 645 |
| HLM | trace 605 | trace 640 |
| InB2 | trace 620 | trace 655 |
| InExpB2 | trace 625 | trace 660 |
| InL2 | trace 615 | trace 650 |
| Tf-Idf | trace 630 | trace 665 |

The mathematically optimum value for the decay parameter $\beta_1$ can be less than the mathematically optimum value for $\beta_2$ that resulted in the highest MAP for the analyzed models as can be seen in FIG. 9 and FIG. 10. These results suggest that the expected stabilization time of the BF change-sets tends to be longer than that of the non-BF change-sets, i.e. the bug fixes take longer to be finally resolved.

Table 7 presents the recall values at several cut-off points in the ranked list with the proposed models for the priors. The row "Baseline" presents the recall results with a uniform prior. Since the size of the source code is not the same for each bug, the average size of the source code can be used to designate the percentage of the code at the reported ranks in parentheses. Here, only the results for the InL2 model are reported because of space limitations. By analyzing 1% of the code on the average, 60.25% of the buggy files were localized with the InL2 model incorporating DHbPd.

TABLE 7

Recall with InL2 incorporating version histories

| Model | R@5 (0.1%) | R@10 (0.2%) | R@25 (0.5%) | R@50 (1%) | R@100 (2%) |
|---|---|---|---|---|---|
| MHbP | 0.1926 | 0.2644 | 0.3966 | 0.5040 | 0.6588 |
| DHbP | 0.2048 | 0.2837 | 0.4189 | 0.5231 | 0.6676 |
| MHbPd ($\beta_1$ = 1.0) | 0.2392 | 0.3170 | 0.4478 | 0.5388 | 0.6421 |
| DHbPd ($\beta_2$ = 5.0) | 0.2519 | 0.3532 | 0.4750 | 0.6025 | 0.6863 |
| Baseline | 0.1555 | 0.2351 | 0.3468 | 0.4485 | 0.5745 |

Using the iBugs dataset, Dallmeier and Zimmerman experimented with FindBugs a static bug pattern detection tool, and Ample, a dynamic bug localization tool. These experiments permit indirectly comparing inventive results with those obtained through static and dynamic analysis. Evaluation shows that FindBugs was not able to locate any of the 369 bugs in the iBugs dataset. On the other hand, various prior experiments with the Ample software are restricted to the 44 bugs that require a single class to be fixed and that have at least one failing test. Ample locates 40% of those bugs by searching at most 10% of the executed classes. Notice that P@1 for the Tf-Idf model incorporating DHbPd is 0.2646, which indicates that, for 77 of the 291 bugs, the first file in the retrieved list is actually a relevant file.

The BugScout experiments on AspectJ are restricted to a single collection of 978 files and 271 bug reports. The accuracy of BugScout is reported in terms of hitrate. If BugScout correctly retrieves at least one relevant file for a bug in a ranked list of a certain size, it is considered to be a "hit." The hitrate for a project is given by the ratio of the total number of hits to the total number of bugs. BugScout's hitrate for AspectJ with a ranked list of 10 files is reported as 35%. Note that the hitrate with a ranked list of 10 files for the InL2 model incorporating DHbPd is 63.5%, indicating more than 80% improvement. Additionally, P@10 for InL2 incorporating DHbPd in various experiments described herein is 0.1065. This ranging advantageously permits a developer to locate a relevant source file by examining a small number of files, e.g., less than eleven. It is noted that parameters of the language modeling approaches and the time decay models can be tuned depending on the nature of a dataset. For example, empirical tuning can be performed.

An approach for incorporating version histories of software files in an IR based framework for bug localization is presented. Various aspects use the information stored in software versioning tools regarding the frequency with which a file is associated with defects and its modifications to construct estimates for the prior probability of any given file to be the source of a bug. Incorporating these priors in an IR based retrieval framework, significantly improves the retrieval performance for bug localization. What is even more remarkable is that when a time decay factor is associated with the priors, the improvement in bug localization goes up even more dramatically. For the retrieval itself, two different algorithms are used, one based on Bayesian reasoning and other on the Divergence from Randomness principle.

In various aspects, techniques described herein can be used for feature and concept localization in software repositories.

Many Information Retrieval (IR) based approaches developed to date for automatic bug localization are based on the bag-of-words assumption that ignores any positional and ordering relationships between the terms in a query. However, bug reports frequently contain various types of structural information whose terms can obey certain positional and ordering constraints. It is therefore desirable to take these constraints into account when searching for the most relevant files, to improve the quality of retrieval for bug localization. The well-known Markov Random Field (MRF) based retrieval framework can be used for taking into account the term-term proximity and ordering relationships in a query vis-a-vis the same relationships in the files of a source-code library to greatly improve the quality of retrieval of the most relevant source files. Experimental evaluations were conducted on popular large software projects using over 4 thousand bug reports. The results demonstrate that the new proposed approach can be superior to the widely used bag-of-words based approaches.

As described above, code search plays an important role in software development and maintenance. The tools that are deployed today for code search range all the way from simple command-line functions like grep to complex search facilities tailored for the specific needs of the developers. These different types of search facilities are used to locate various parts of a software library for concept location, change impact analysis, traceability link analysis, and so on. For automatic bug localization, the bug reports can be used as text queries to Information Retrieval (IR) engines to find, using a search tool, the corresponding software constructs that should be modified to implement a fix for the bugs. The user can select a desired granularity, e.g., to search for relevant files or for relevant subroutines.

The success of an IR framework that leverages bug reports for automatic bug localization depends much on how the bug reports are represented vis-a-vis the source code files and other documents in a library. In the widely used bag-of-words representations for both the queries and the source code documents, all positional and ordering relationships between the terms are lost. A bug report, in general, is a composition of structured and unstructured textual data that frequently includes (a) patches; (b) stack traces when the software fault throws an exception; (c) snippets of code; (d) natural language sentences; and so on. Patches and stack traces, especially, contain inter-term proximity and ordering relationships that can be exploited for the purpose of retrieval. For example, if two terms are proximal to each other in a stack trace, source code files containing similar code can have the same two terms in a similar proximal relationship. It is demonstrated herein that the quality of retrieval improves greatly when a retrieval framework allows for ordering and positional (through proximity) relationships to be taken into account in the retrieval process.

For example, inter-term proximities can be used to reformulate the queries in order to improve the quality of retrievals. The query reformulation can take place through a two-step process that is carried out without any additional input from the user. In the first step, the top-ranked retrievals for the user-supplied query are analyzed for the detection of terms that are proximal to the query terms as supplied by the user. The proximal terms thus discovered are used to enrich the original query in the second step. It is shown that the retrieval for the query reformulated in this way is significantly more precise than it is for the original query. Further detail is given in Sisman et al. (B. Sisman and A. C. Kak, "Assisting code search with automatic query reformulation for bug localization," in *Proceedings of the 10th Working Conference on Mining Software Repositories*, ser. MSR '13. Piscataway, N.J., USA: IEEE Press, 2013, pp. 309-318), incorporated herein by reference.

Using a Markov Random Field (MRF) to model the ordering and the positional dependencies between the query terms vis-a-vis the documents can provide a higher retrieval precision and permits the use of simple or complex constraints on, e.g., ordering and proximity. In the MRF based approach, certain subsets of the terms in a bug report are used for scoring the software artifacts while taking into account term-term proximity and order. This approach uses the fact that the software artifacts that contain the query terms in the same order or in similar proximities as in the query itself are more likely to be relevant to a given query.

MRF is a powerful approach to the modeling of query-document relationships. In various aspects, it is used in conjunction with "Query Conditioning" (QC). A bug report can include, e.g., a textual narrative, a stack trace, or a patch. In various aspects, inter-term relationships have different weights in different parts of the bug report. For example, the proximity of the terms used in the stack trace portions of a bug report carries far more weight than in the textual narrative. Therefore, the ordering and proximity constraints are likely to be more discriminative in those portions of bug report that, by their very nature, are more structured.

Figure 2:
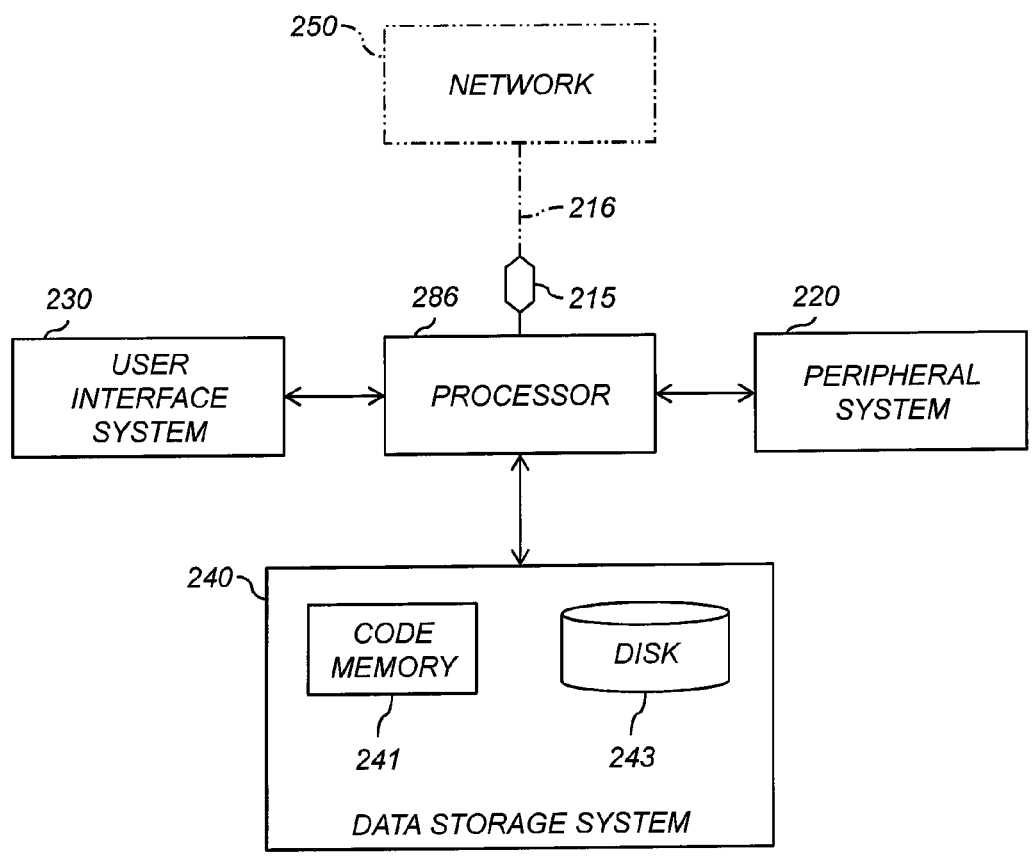
FIG. 2 is a high-level diagram showing components of a data-processing system.

A code retrieval engine that includes both QC and MRF modeling can be implemented using processor 286, FIG. 2.

Processor 286 can apply MRF modeling to all queries and can apply QC to all queries or only to queries including structured elements. Detecting the structured elements in bug reports can be done in various ways, e.g., taking into account that such elements can have different formats and can be surrounded by other types of textual data. It is also not uncommon for these constructs to undergo unexpected format changes, such as those caused by accidental line breaks, when they are copied into a bug report. In order to overcome these challenges, processor 286 can employ several regular expressions or other text-processing techniques to detect and extract these structured elements from bug reports.

The proposed bug localization framework is experimentally validated on three large software libraries: AspectJ, GOOGLE CHROME, and Eclipse 3.1. It is shown that MRF modeling of the queries and the query conditioning step (whenever the queries lend themselves to such conditioning) significantly improve the accuracy with which the bugs can be localized. In order to investigate the effect of the length of queries on the precision with which the bugs are localized, retrievals are carried out with just the bug report titles and with the bug reports taken in their entirety. Whereas MRF modeling resulted in improved precision in bug localization even for short queries including of just the bug report titles, the improvements were even more significant when the bug reports in their entirety were subject to MRF modeling and the QC step. Experimental results described herein also include comparison with the other state of the art IR based approaches to bug localization that shows advantageously improved performance of various aspects compared to prior schemes.

Below are presented MRF modeling techniques according to various aspects, e.g., along with Query Conditioning.

Empirical evaluation was performed of various aspects described herein using data from large open-source software projects. This evaluation shows that various aspects herein provide improved accuracy of automatic bug localization.

In various aspects, a Spatial Code Proximity (SCP) based Query Reformulation (QR) algorithm is used, in which a given short query is enriched with additional informative terms drawn from the highest ranked retrieval results with respect to the original query for an improved retrieval accuracy.

Figure 11A:
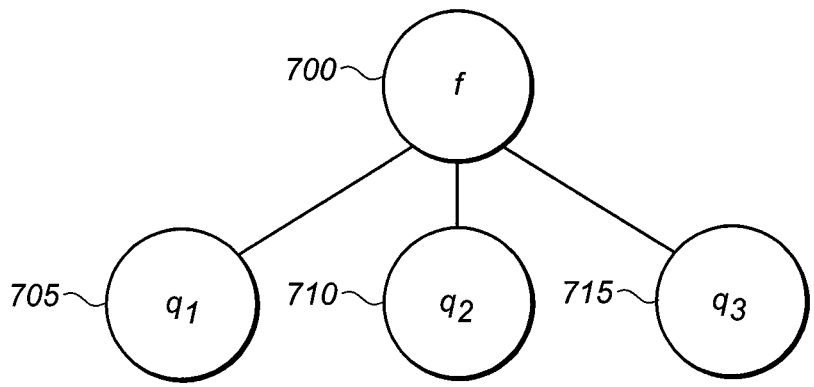
FIGS. 11A, 11B, and 11C show exemplary Markov networks representing inter-term dependencies in a query.
Figure 11B:
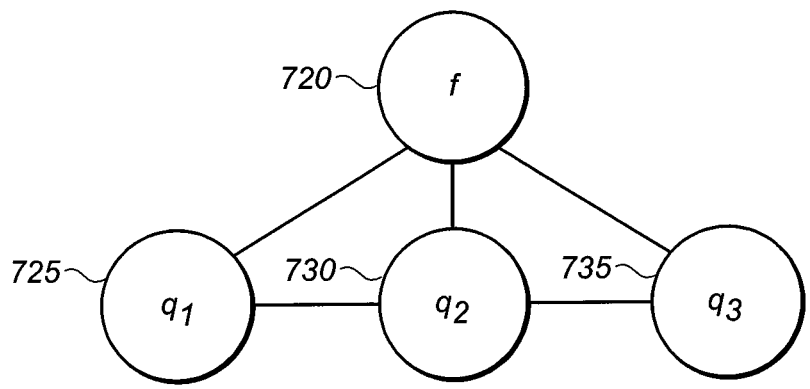
Figure 11C:
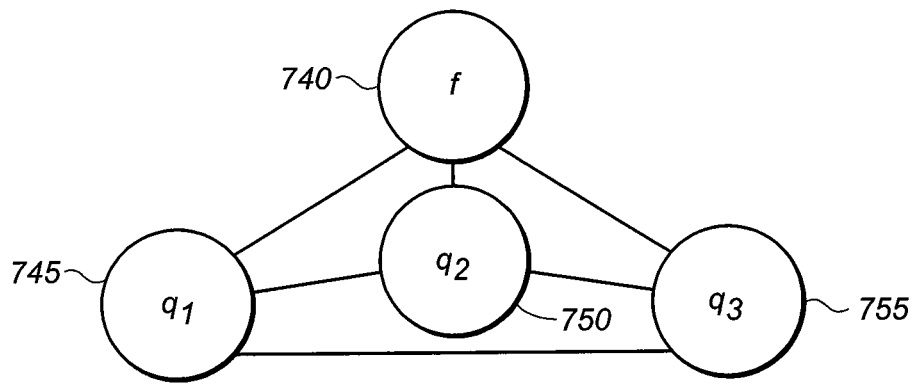

FIGS. 11A, 11B, and 11C show exemplary Markov networks for capturing the inter-term dependencies in a query vis-a-vis a document. These figures show an example of a single file f (nodes 700, 720, 740, respectively, in the three figures) and a query with three terms $q_1$ (nodes 705, 725, 745), $q_2$ (nodes 710, 730, 750), and $q_3$ (nodes 715, 735, 755). Three different MRF based models are shown. FIG. 11A shows full independence, FIG. 11B shows sequential dependence, and FIG. 11C shows full dependence.

Prior schemes for bug localization compare the first-order distribution of terms in a query vis-a-vis the documents. This applies as much to simple approaches based on VSM and Unigrams as it does to approaches based on LDA that use hidden variables for injecting additional degrees of freedom for comparing the queries with the documents.

In various aspects, Markov Random Fields (MRF) can be used to incorporate arbitrary inter-term relationships between the terms of a query vis-a-vis the documents.

Three different specializations of MRF modeling are described below. The Query Conditioning (QC) method extracts from a query those portions that are particularly suited to modeling by MRF. MRF improves retrievals even in the absence of QC. By giving greater weight to the inter-term relationships in those portions of a query that QC has identified to be as being highly structured, the quality of retrievals can be further improved.

Markov Random Fields (MRFs) permit probabilistic modeling of arbitrary dependencies amongst a collection of variables and can be based on directed or undirected graphs. The nodes of such graphs represent the variables and the arcs the pairwise dependencies between the variables. Another example of a directed-graph approach is a Bayesian Belief Networks. The set of variables that any given variable directly depends on is determined by the node connectivity patterns. In a Bayesian Belief Network, the probability distribution at a node q is conditioned on only those nodes that are at the tail ends of the arcs incident on q, taking the causality into account. In a Markov Network (derived from an MRF), on the other hand, the probability distribution at a node q depends on the nodes that are immediate neighbors of q without considering any directionality. In the context of retrieval from natural language corpora, Markov Networks are particularly appropriate for the modeling of inter-term dependencies vis-a-vis the documents.

In general, given a graph G whose arcs express pairwise dependencies between the variables, MRF modeling of the probabilistic dependencies amongst a collection A of variables is based on the assumption that the joint distribution over all the variables in the collection can be expressed as product of non-negative potential functions over the cliques in the graph:

$$P(A) = \frac{1}{Z}\prod_{k=1}^{K} \phi(C_k) \qquad (20)$$

where $\{C_1, C_2, \ldots, C_K\}$ represents the set of all cliques in the graph G, and $\phi(C_k)$ a non-negative potential function associated with the clique $C_k$. In the expression above, Z is merely for the purpose of normalization since it is desired to compute the sum of P(A) over all possible values that can be taken by the variables in A to add up to unity.

A goal of MRF is to rank the files in the code base according to the probability of a file f in the software library to be relevant to a given query Q. This probability is denoted by P(f|Q). Using the definition of the conditional probability:

$$P(f \mid Q) = \frac{P(Q, f)}{P(Q)}. \qquad (21)$$

Various aspects rank the files. Since the denominator in Eq. 21 does not depend on files, it can be ignored in these aspects. Hence $$P(f \mid Q) \stackrel{rank}{=} P(Q, f).$$

In order to separate out the roles played by the variables that stand for the query terms (since the inter-term dependencies in the queries are being used) vis-a-vis the contents of a source file f, the following variation of the general form expressed in Eq. 20 can be used to compute this joint probability:

$$P(Q, f) = \frac{1}{Z}\prod_{k=1}^{K} \phi(C_k) \stackrel{rank}{=} \sum_{k=1}^{K} \log(\phi(C_k)) \qquad (22)$$

where Q stands for a query which is assumed to include the terms $q_1, q_2, \ldots, q_{|Q|}$ and f a file in the software library. The nodes of the graph G in this case include the query terms, with one node for each term. G also contains a node that is reserved for the file f whose relevancy to the query is in question. As before, in an example, this graph contains the cliques $\{C_1, C_2, \ldots, C_K\}$. As shown in the formula, for computational ease it is traditional to express the potential $\psi(C_k)$ through its logarithmic form, that is through $\psi(C_k) = \log(\phi(C_k))$.

The fact that a fundamental property of any Markov network is that probability distribution at any node q is a function of only the nodes that are directly connected to q may now be expressed as $$P(q_i|f, q_{j \neq i} \in Q) = P(q_i|f, q_j \in \text{neig}(q_i)) \qquad (23)$$

where neig($q_i$) denotes the terms whose nodes are directly connected to the node for $q_i$. As has been described, this fact allows arbitrary inter-term relationships to be encoded through appropriate arc connections amongst the nodes that represent the query terms in the graph G. In an example, query terms are all assumed to be independent of one another, and the graph can contain no arcs between terms. This assumption, known as the usual bag-of-words assumption in information retrieval, is referred to as Full Independence (FI). In another example, the graph can be fully connected so that the probability distribution at each node representing a query term depends on all the other query terms (besides being dependent on the file f). This is referred to as Full Dependence (FD). FIGS. 11A and 11C depict the graph G for FI and FD assumptions for the case when a query Q includes exactly three terms.

MRFs can model other "intermediate" forms of dependencies that are between the two extremes of the FI and the FD assumptions. This can be done by simply choosing graphs G of different connectivity patterns. Whereas FI is based on the absence of any inter-term arcs in G and FD on there being an arc between each query term and every other term, other models can be used such as the one depicted in FIG. 11B. This dependency model, referred to as the Sequential Dependency (SD) model, incorporates both order and proximity between a sequence $(q_1, q_2, \ldots, q_{|Q|})$ of query terms.

An appropriate connectivity pattern can be determined by a software library. Suppose a phrase level analysis of the files in the library indicates that the phrase "interrupt sig handler" occurs in the files and can be used to discriminate between them. The nodes for the terms "interrupt," "sig," and "handler" can be connected in the manner shown in FIG. 11B. This is because the SD model shown in that figure would match pairwise (but ordered) occurrences of the words "interrupt," "sig," and "handler" files. The frequencies with which these ordered terms appear in the files may also carry discriminatory power. The relative importance of the words occurring individually or in ordered pairs would be determined by their relative frequencies in the files. In contrast to the case depicted in FIG. 11B, should it happen that the queries and the relevant files contain the three terms "interrupt," "sig," and "handler" in all possible orders, the FD assumption depicted in FIG. 11C can be used. In this case, the number of times these terms occur together within a window of a certain size would carry discriminatory power for choosing the files relevant to a query. If the three terms occur in the relevant files without there being a phrasal sense to their appearance in the files, the bag-of-words (FI) assumption can be used.

Figure 12:
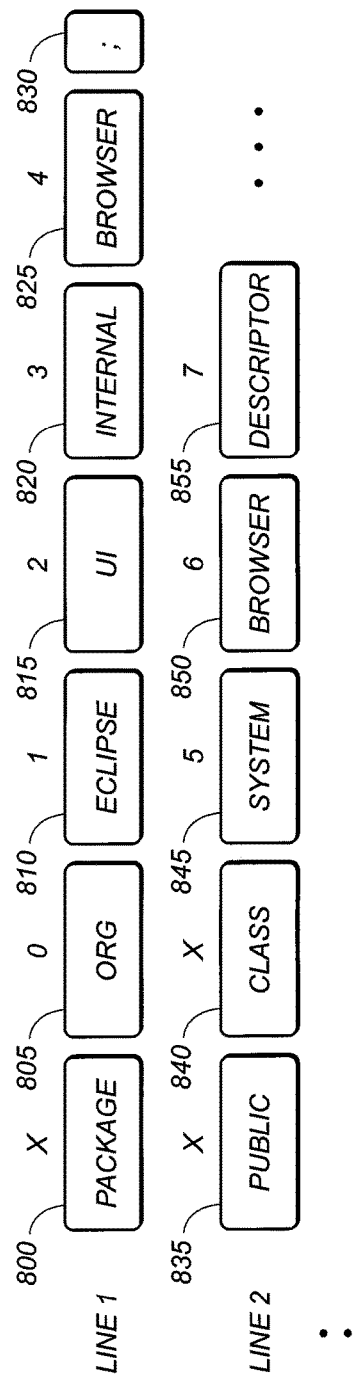
FIG. 12 shows an illustration of indexing the positions of the terms in a source code file.

FIG. 12 shows an illustration of indexing the positions of the terms in an Eclipse Class: SystemBrowerDescriptor.java. The 'x' symbol indicates the stop-words that are dropped from the index. As shown, words 800, 835, and 840 are programming-language-specific stopwords. Word 830 is a punctuation character and is dropped in this example. Words 805, 810, 815, 820, 825, 845, 850, and 855 are indexed at positions 0 . . . 7, respectively.

The graph connectivity induced by the notion of Spatial Code Proximity (SCP) can advantageously be used. SCP include first associating a positional index with each term in a query and in the documents as shown in FIG. 12. The values of the positional indexes are translated into graph models based on the FI, SD, and FD assumptions. Below are presented formulas that show how these models can be derived from SCP based indexes.

As already stated, the FI assumption reduces an MRF model to the usual bag-of-words model that has now been extensively investigated for automatic bug localization. As should be clear from the graph representation of this model depicted in FIG. 11A for the case of a query with exactly three terms, FI modeling involves only 2-node cliques. Therefore, under MRF modeling, the probability of a query given a file is simply computed by summing over the 2-node cliques:

$$P_{FI}(f|Q) \stackrel{\text{rank}}{=} \sum_{i=1}^{|Q|} \psi_{FI}(q_i, f).$$

The choice of the potential function, can be critical in computing this probability, should be in accord with the fact that MRF under FI assumption amount to the bag-of-words modeling. Therefore, a good choice is to make the potential $\psi_{FI}(q_i, f)$ proportional to the frequency of the query term $q_i$ in the file f. Since the zero probability associating with a query term $q_i$ that does not appear in a file f can create problems when estimating the relevance of f to a query, it is common to add what is referred to as a smoothing increment to the term frequencies. A powerful smoothing approach, known as Dirichlet smoothing, uses the frequency of a term in the entire corpus. Shown below is a formula for the potential $\psi_{FI}(q_i, f)$ that includes Dirichlet smoothing:

$$\psi_{FI}(q_i, f) = \lambda_{FI} \log\left(\frac{tf(q_i, f) + \mu P(q_i|C)}{|f| + \mu}\right) \qquad (24)$$

where $P(q_i|C)$ denotes the probability of the term in the whole collection, $tf(q_i, f)$ is the term frequency of $q_i$ in a file f, $|f|$ denotes the length of the file and $\mu$ is the Dirichlet smoothing parameter. The model constant $\lambda_{FI}$ has no impact on the rankings with this model. However, it is kept in the formulation as it will be used it later in SD and FD modeling.

The probability expression shown above for the relevance of a term to a file is exactly the same as it appears in the widely used bag-of-words model known as the Smoothed Unigram Model (SUM). The retrieval results obtained with FI will be used as the baseline in order to show improvements obtained with the other two models, SD and FD.

The SD model takes the order and the proximity of the terms into account in such a way that the probability law for a query term $q_i$ given a file f obeys $P(q_i|f, q_j \in \{q_1, \ldots, q_{i-1} q_{i+1}, \ldots, q_{|Q|}\}) = P(q_i|f, q_{i-1}, q_{i+1})$.

To see how a software library can be processed to induce the SD model, note from the example shown in FIG. 11B that 3-node cliques are present in addition to the 2-node cliques of the FI model. Therefore, the frequencies with which pairs of terms occur together, with one following the other (without necessarily being adjacent) in a specific order, can be counted in addition to counting the frequencies for the terms occurring singly as in the FI model. Again incorporating Dirichlet smoothing for the same reasons as in the FI model, the following potential function is employed for the 3-node cliques corresponding to a file f and two consecutive query terms $q_{i-1}$ and $q_i$:

$$\psi_{SD}(q_{i-1}, q_i, f) = \lambda_{SD} \log\left(\frac{tfw(q_{i-1}q_i, f) + \mu P(q_{i-1}q_i \mid C)}{|f| + \mu}\right) \quad (25)$$

where $tf_W(q_{i-1}q_i, f)$ is the number of times the terms $q_{i-1}$ and $q_i$ appear in the same order as in the query within a window length of W≥2 in the file. For W>2, the terms do not have to be adjacent in the file and the windows may also contain other query terms. The smoothing increment $P(q_{i-1}q_i|C)$ is the probability associated with the pair $(q_{i-1}q_i)$ in the entire software library. To the potential function shown above, the potential function for 2-node cliques described above for the FI model can be added:

$$P_{SD}(f \mid Q) \stackrel{rank}{=} \sum_{i=2}^{|Q|} \psi_{SD}(q_{i-1}, q_i, f) + \sum_{i=1}^{|Q|} \psi_{FI}(q_i, f). \quad (26)$$

The ranking of the files with the potential function shown in Eq. 26 is only sensitive to the relative weights expressed by the model parameters $\lambda_{FI}$ and $\lambda_{SD}$, the overall scaling of these weights being inconsequential on account of the unit summation constraints on probabilities. In various aspects, $\lambda_{FI}+\lambda_{SD}=1$. $\lambda_{SD}$ can be an interpolation or a mixture parameter that controls the relative importance of the 3-node cliques vis-a-vis the 2-node cliques.

As demonstrated previously by FIG. 11C, the FD assumption implies a fully connected graph G whose nodes correspond to the individual query terms, with one node being reserved for the file f under consideration. The graph being fully connected allows for a file f to be considered relevant to a query regardless of the order in which the query terms occur in the file. (Compare this to the SD case where, for a file f to be considered relevant to a query, it would contain the query terms in the same order as in the query.) Therefore, the FD assumption provides a more flexible matching mechanism for retrievals.

The price to be paid for the generality achieved by FD is the combinatorics of matching all possible ordering of the query terms with the contents of a file. To keep this combinatorial explosion under control, processing can be restricted to just 2-node and 3-node cliques. This example is not limiting; any clique size can be used. While this may sound the same as for the SD assumption, note that the 3-node cliques are now allowed for a pair of query terms for both ordering of the terms. Therefore, for any two terms $q_i$ and $q_j$ of the query, the potential function takes the following form for the 3-node cliques:

$$\psi_{FD}(q_i, q_j, f) = \lambda_{FD} \log\left(\frac{tfw(q_iq_j, f) + \mu P(q_iq_j \mid C)}{|f| + \mu}\right) \quad (27)$$

where $\lambda_{FD}$ again works as a mixture parameter similar to $\lambda_{SD}$, i.e. $\lambda_{FI}+\lambda_{FD}=1$; $\mu$ is the smoothing parameter and $tf_W(q_iq_j, f)$ is the frequency for the pair $q_iq_j$ in f. Summing over the cliques, the ranking score of a file is obtained by $$P_{FD}(f \mid Q) \stackrel{rank}{=} \sum_{i=1}^{|Q|} \sum_{j=1, j\neq i}^{|Q|} \psi_{FD}(q_i, q_j, f) + \sum_{i=1}^{|Q|} \psi_{FI}(q_i, f). \quad (28)$$

An example is now described to compare the retrieval effectiveness of the three models, FI, SD, and FD. The example relates to a bug report that only contains a one-line text narrative, corresponding to the title of the bug report.

The bug 98995 filed for Eclipse v3.1 has a title that reads: "Monitor Memory Dialog needs to accept empty expression". After removing the stop-words from the title, the final query includes seven unique terms. For reference, the target source files that were eventually modified to fix this bug are:
1. org.eclipse.debug.ui/ . . . /ui/views/memory/MonitorMemoryBlockDialog.java
2. org.eclipse.debug.ui/ . . . /ui/views/memory/AddMemoryBlockAction.java
3. org.eclipse.debug.ui/ . . . /ui/DebugUIMessages.java.

Table 8 presents the retrieval accuracies obtained for this query, with the FD, SD, and FI models, along with the number of cliques used for each dependency assumption. In the table, the column "Rank" gives the ranks of the three relevant files in the ranked lists retrieved. AP is the resulting Average Precision.

TABLE 8

Retrieval accuracies for the Bug 98995 with three different MRF models.

| Method | 2-node cliques | 3-node cliques | Ranks | AP |
|--------|----------------|----------------|--------|--------|
| FD | 7 | 2 | 1-3-2 | 1.0000 |
| SD | 7 | 6 | 2-3-4 | 0.6389 |
| FI | 7 | 0 | 6-5-10 | 0.2778 |

FI ranks several irrelevant files above the relevant ones. One such file is ASTFlattener.Java. Although this file does not contain any of the terms "monitor", "memory" and "dialog"; it is retrieved at the top rank by this model because, as a file related to parsing the Abstract Syntax Trees (AST), it contains the terms "accept", "empty" and "expression" with very high frequencies. The FI model does not take the context of the query into account.

In comparison to FI, SD is able to retrieve the relevant files at higher ranks, as shown in Table 8. The improvement obtained with SD is a consequence of the discriminations achieved by requiring that the query terms, when they appear together in a source file, do so in a specific order.

Figure 13:
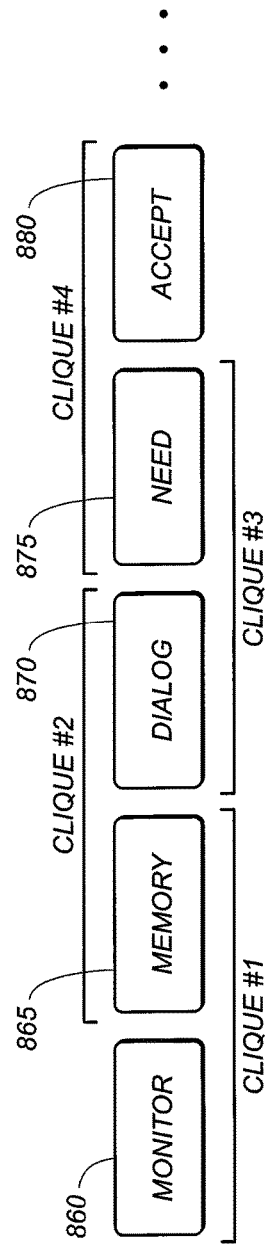
FIG. 13 shows an example of cliques for words in a source code file.

FIG. 13 shows an example of clique creation for Bug 98995, and specifically of the creation of 3-node cliques with the query terms. The figure shows the first 4 query term blocks for the 3-node cliques utilized by the SD modeling. As shown, each term 860, 865, 870, 875, 880 can participate in multiple cliques as a two-word window (the query term block) slides over the indexed text. A 3-node clique is formed by the two words depicted together with an underbracket and the node corresponding to a file. Since the relevant files contain these term blocks in close proximity with high frequencies; with this model, they receive higher ranking scores in comparison to the irrelevant files.

Despite the improvements, SD still ranks one irrelevant file, ASTRewriteFlattener.java, above all the relevant ones. This file also does not contain any of the terms "monitor", "memory" and "dialog". However, it contains in close proximity the term pairs from the 2 of the 3-node cliques: "accept empty" and "empty expression". The file manages to receive a high ranking score with these term pairs in addition to the AST related terms.

FD captures the context of the query better than the other two models by considering all the term pairs in the query regardless of their position and order. It assumes that any pair of query terms can depend on one another, hence the number of cliques it uses is higher. This modeling approach ranks the three relevant files at the top ranks above any irrelevant files and reaches a perfect average precision of 1.0.

When a bug report contains highly structured components, such as a stack trace and/or a source code patch, such information can be very useful in locating the files relevant to the bug. Being highly structured, these components can first be identified as such and subsequently processed to yield the terms that can then be used to form a query for IR based retrieval. This is referred to as Query Conditioning (QC) The processing steps needed for that purpose will be different for different types of components, e.g., stack traces and source code patches. QC is carried out with a set of (e.g.) regular expressions that, while custom-designed for the different types of structured components encountered, are sufficiently flexible to accommodate small variations in the structures. QC can take into account the stack traces and source code patches when they can be identified in a bug report. A bug report may also contain additional source code snippets that are not meant to be patches. QC can treat any additional such code on par with the main textual part of the report.

Table 9 shows a stack trace that was included in the report for Bug 77190 filed for Eclipse. With QC, the trace is first detected in the report with regular expression based processing. Subsequently, the highlighted lines are extracted as the most likely locations of the bug and fed into the MRF framework.

TABLE 9

Exemplary Stack Trace java.util.EmptyStackException
    at java.lang.Throwable.<init>(Throwable.java)
    at java.util.Stack.peek(Stack.java)
    at java.util.Stack.pop(Stack.java)
    at org.eclipse.jdt.internal.debug.eval.ast.engine.Interpreter.-
        pop(Interpreter....java:89)
    at org.eclipse.jdt.internal.debug.eval.ast.Instructions.Instruction.-
        popValue(...Instruction.java:111)
    at org.eclipse.jdt.internal.debug.eval.ast.Instructions.-
        PushFieldVariable....execute(PushFieldVariable.java:54)
    at org.eclipse.jdt.internal.debug.eval.ast.engine.Interpreter.-
        execute(Interpreter....java:50)
    .
    .
    .
    at org.eclipse.core.internal.jobs.Worker.run(Worker.java:66)

With regard to the flow of processing related to QC as performed by processor 286, regular expressions are used to first identify the patches and the stack traces from a given bug report if any of these elements are available in the report. Then, those elements are processed separately to sift out the most relevant source code identifiers to be used in the retrievals. The final query is composed from the terms extracted from the stack traces and the patches if one or both of these components are available. If these structured components are not available, processor 286 automatically uses the entire bug report as bulk text and feeds it into the MRF framework.

When processor 286 detects the stack traces in a bug report, it automatically extracts the most likely locations of the bug by identifying the methods in the trace. As the call sequence in a stack trace starts from the most recent method call (or, in some languages, ends with the most recent call), only the topmost (bottommost) T methods can be extracted while discarding the rest of the trace since the methods down in the trace have a very little chance of containing any relevant terms and they are likely to introduce noise into the retrieval process. Table 9 illustrates the stack trace that was included in the report for Bug 77190 filed for Eclipse. The bug caused the EmptyStackException to be thrown by the code in PushFieldVariable.java and was subsequently fixed in a revised version of this code. The figure highlights the extracted portion of the stack trace that is used in forming the final query. The methods extracted can be limited to those that are present in the code base to which the bug report applies. That is, methods from the libraries belonging to the Java platform itself can be skipped, as illustrated in the figure. During the experiments, T=3 was set experimentally, as this setting resulted in accurate retrieval on the average. As is shown in the experimental evaluation, this filtering approach increases the precision of the retrievals significantly.

Source code patches are included in a bug report when a developer wishes to also contribute a possible (and perhaps partial) fix to the bug. When contributed by an experienced developer, these components of a bug report can be directly used for pinpointing the files relevant to a bug.

A patch for a given bug is usually created with the Unified Format to indicate the differences between the original and the modified versions of a file in a single construct. With this format, the textual content of the patch contains the lines that would be removed or added in addition to the contextual lines that would remain unchanged in the file after the patch is applied. For term extraction from the patches, processor 286 does not use the lines that would be added after the suggested patches are applied to the files as those lines are not yet present in the code base.

The files mentioned by a developer in a patch may not correspond to the actual location of the bug. And, there may be additional files in the code base that may require modifications in the final fix for the bug. While the importance of information in such source code patches cannot be overstated, it is important to bear in mind that their inclusion in the bug reports is more the exception than the rule. Out of the 4,035 bug reports analyzed for Eclipse v3.1, only 8 contained a patch. Along the same lines, out of the 291 bug reports analyzed for the AspectJ project, only 4 contained a patch. Nonetheless, considering the importance of the information contained in the patches when they are included in a bug report, processor 286 automatically takes advantage of that information whenever it can.

Figure 14:
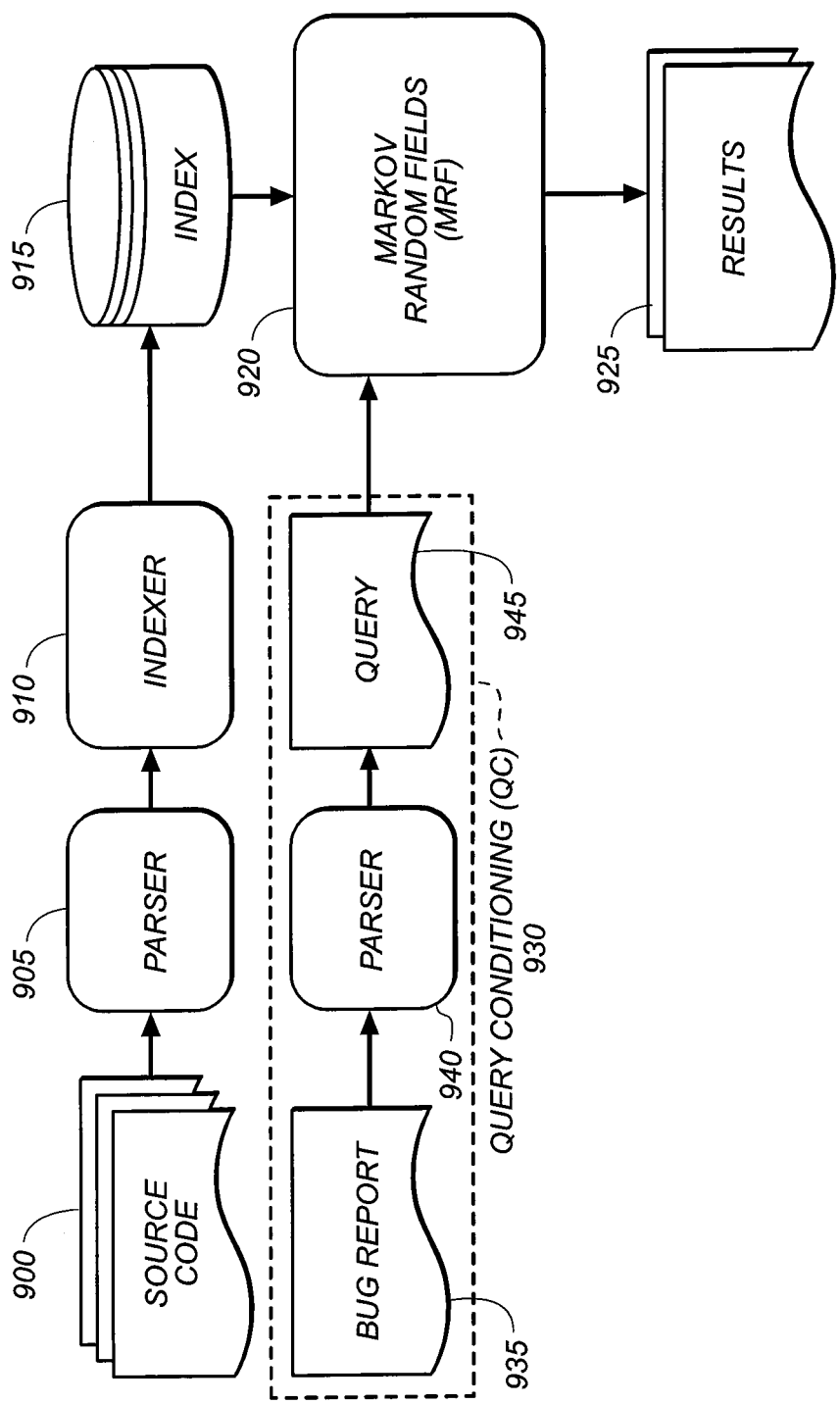
FIG. 14 shows an illustration of data flow in a retrieval framework according to an exemplary aspect.

FIG. 14 shows an illustration of the data flow in a retrieval framework according to an exemplary aspect, e.g., using QC and MRF. Steps and blocks shown here can be implemented using processor 286 and other components shown in FIG. 2. The source code 900 is parsed (block 905) and indexed (block 910), and the results are stored in index 915, as discussed above. The QC process includes receiving a bug report 935, parsing, e.g., elements such as patches or stack traces out of the report 935 in block 940, and formulating a query 945 using those elements. The query 945 is applied to the index 915 using MRFs 920, e.g., as discussed above.

This produces results 925, e.g., a ranked list of source code artifacts, that can be presented to a user, e.g., via a user interface system 230 (FIG. 2).

TABLE 10

Evaluated Projects

| Project, Description | Language | \|B\| | \|RF\| | $\|Q_{Title}\|$ |
|---|---|---|---|---|
| AspectJ, An Extension to Java Programming Language | Java | 291 | 3.09 | 5.78 |
| Eclipse v3.1, Integrated Development Environment | Java | 4,035 | 2.76 | 5.80 |
| Chrome v4.0, WEB Browser | C/C++ | 358 | 3.82 | 6.21 |

The effect of incorporating term dependencies on the retrievals for bug localization was evaluated on three large software projects, namely Eclipse IDE (www.eclipse.org), AspectJ (eclipse.org/aspectj/) and Google Chrome (www-.google.com/chrome). QC was evaluted on only Eclipse and AspectJ as the bug reports for Chrome do not contain stack traces or patches. The analysis used a set of bug reports, denoted B, that were filed for these projects. For ground truth, the files modified to fix the corresponding bugs were used as the relevant file set to be retrieved by the retrieval engine. The relevant file set for a bug report is denoted by RF.

Since bug tracking databases such as Bugzilla (e.g., for Eclipse, bugs.eclipse.org/bugs/) does not usually store the modification histories of the changes made to the files in response to the bug reports, researchers commonly use the commit messages in the repository logs in order to link the modifications to the bug reports in a bug tracking database. BUGLinks and iBugs are two public datasets that reconstruct the links between the bug reports and the files relevant to the bugs in the repositories for the projects used. The BUGLinks dataset contains information related to the Eclipse and the Chrome projects, and the iBugs dataset contains information related to the AspectJ project. Tables 10 and 11 present various statistics drawn from these datasets regarding the three projects used in the evaluation study. In Table 10, |B| denotes the number of bug reports used in querying the code base of each project, |RF| the average number of relevant files per bug, and $|Q_{Title}|$ the average lengths of the bug report titles that are used in the retrievals. As is described herein, the experimental studies involve two types of experiments: those that are based on just the titles of the bug reports, and those that include the titles and the bug descriptions. Whereas MRF modeling can be applied to both types of queries, query conditioning (QC) can only be investigated for the latter type.

Table 11 presents the statistics of the bug reports used in the evaluation of the MRF framework along with QC. In the table, #Patches and #Stack Traces show the number of bug reports containing patches and stack traces, respectively, and $|Q_{Title+Desc}|$ is the average lengths of the bug reports, including both the title and the description parts without any filtering, in terms of the number of tokens used in querying the code base.

Preprocessing can be done by processor 286, e.g., as discussed above. In various aspects, for the indexing of a particular version of the target code base, the compound terms are split using punctuation characters (e.g., the_magical→"the," "magical") and camel casing (e.g., Mystery-Tour→"mystery," "tour"). Programming-language-specific terms and a set of standard English stop words are dropped. The remaining terms are then stemmed into their common roots using the Porter stemming algorithm. The position of each term extracted from the files is recorded after these preprocessing steps, as illustrated in FIG. 12. As for the bug reports, they are also subject to the same preprocessing steps.

Subsequent to preprocessing, processor 286 represents a file my a multidimensional array that can be accessed via its ID. This data structure contains term IDs, the corresponding term frequencies and the positions of the terms in the file. For each term in a given query, the files that contain the term are accessed via an Inverted Index in which a term is represented by a two dimensional array that stores the file IDs and the frequency of the term in those files.

TABLE 11

Various statistics related to the bug reports used in the experiments for the evaluation of MRF and QC.

| Project | #Patches | #Stack Traces | $\|Q_{Title+Desc}\|$ |
|---|---|---|---|
| Aspect J | 4 | 81 | 56.77 |
| Eclipse v3.1 | 8 | 519 | 44.11 |

Figure 15A:
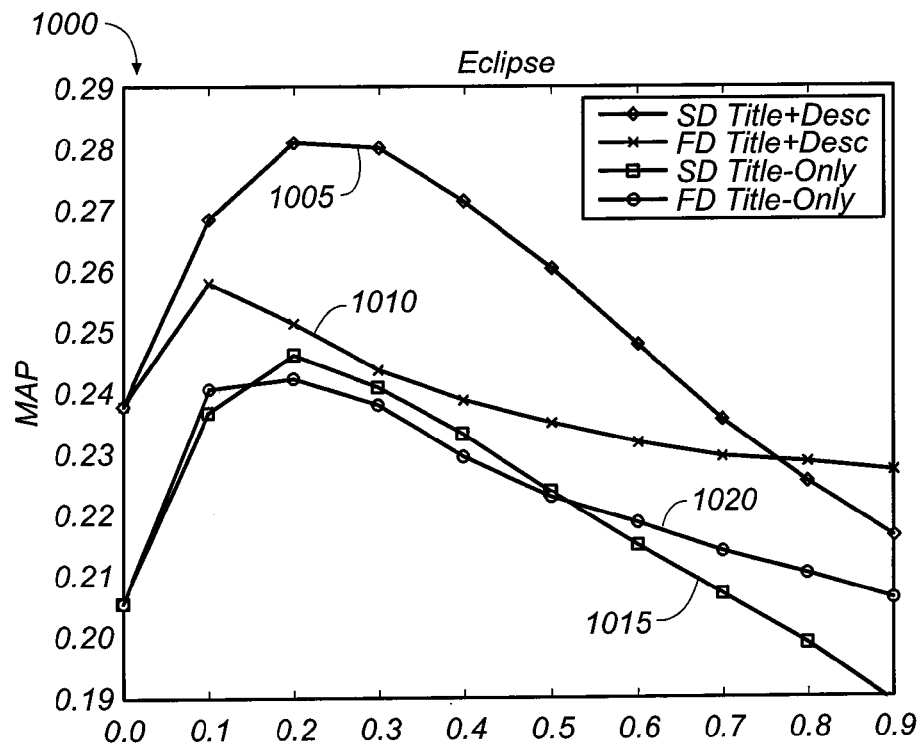
FIGS. 15A, 15B, 16A, and 16B show experimental data of effects of model parameter variation on retrieval of source code files according to various aspects.
Figure 15B:
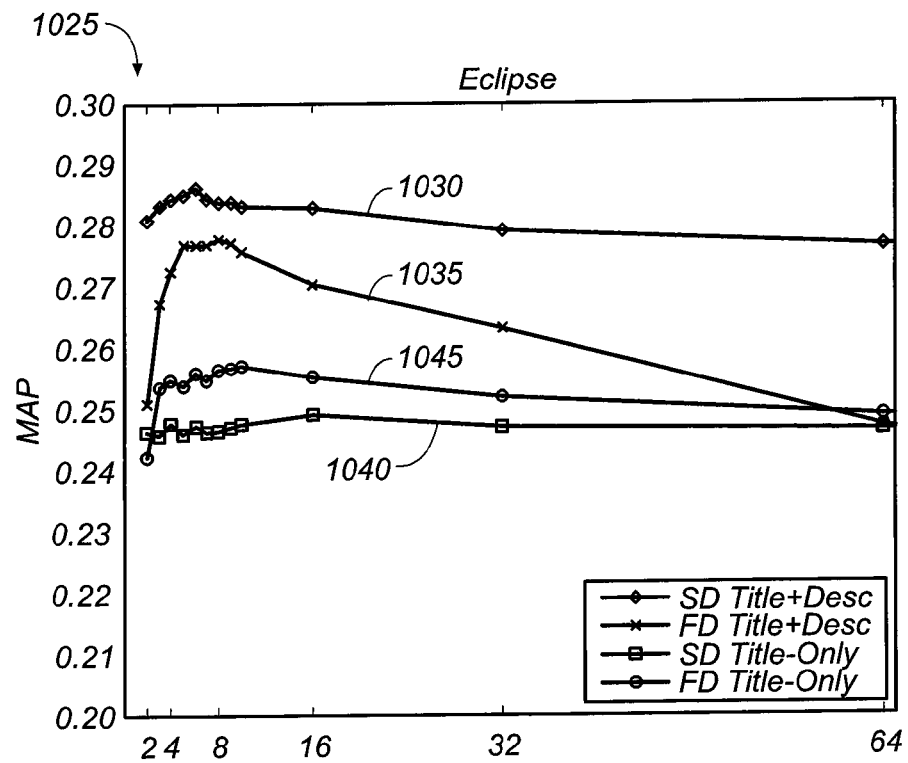

FIGS. 15A and 15B show the effects of varying model parameters on MAP for Eclipse in a tested example. FIG. 15A shows the MAP values as the mixture parameters ($\lambda_{SD}$ for SD assumption and $\lambda_{FD}$ for FD assumption) are varied while the window length parameter is fixed as W=2. FIG. 15B shows the MAP values as W is varied while the mixture parameters are fixed at 0.2.

Figure 16A:
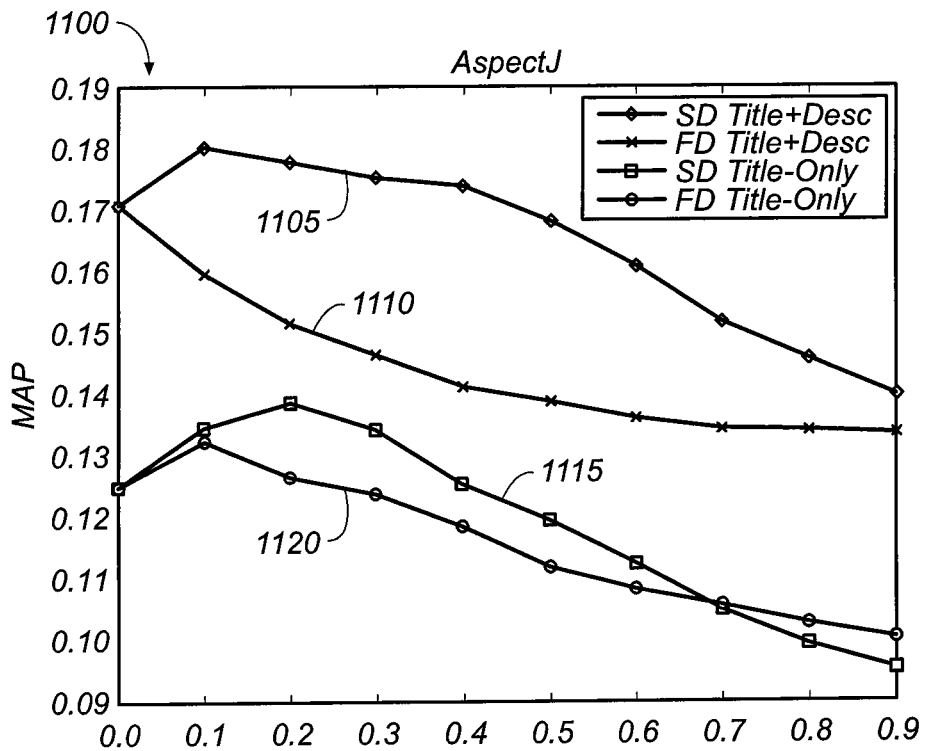
Figure 16B:
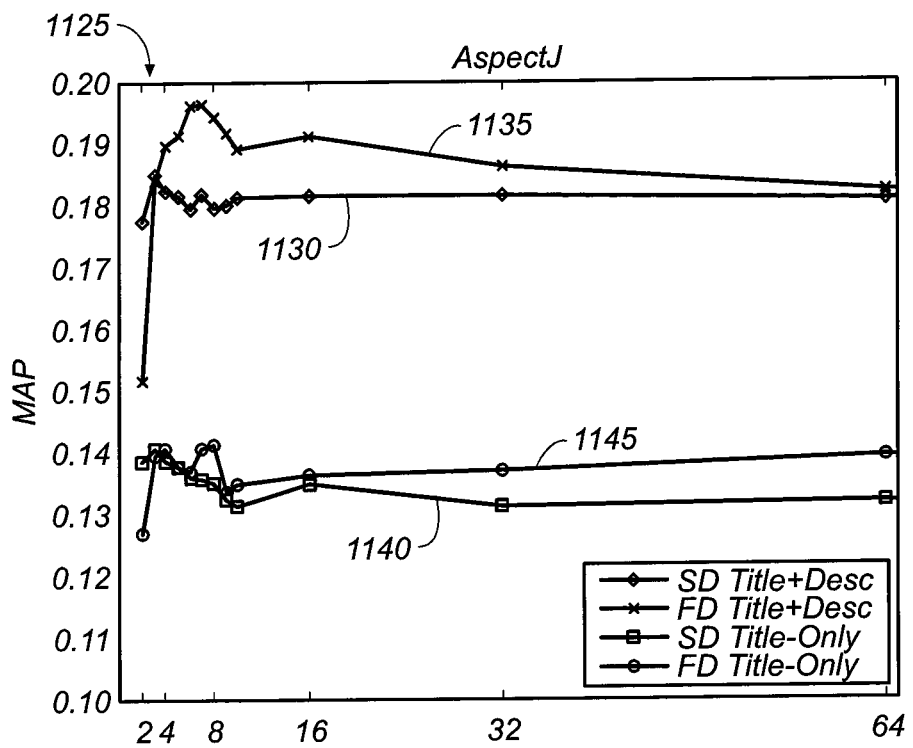

FIGS. 16A and 16B show the effects of varying model parameters on MAP for AspectJ in a tested example. The axes are as in FIGS. 15A and 15B, respectively. Results for various models are shown, as indicated in Table 12.

TABLE 12

Data shown in FIGS. 15A, 15B, 16A, and 16B

| | | Traces in | | | |
|---|---|---|---|---|---|
| MRF | Query terms | FIG. 15A | FIG. 15B | FIG. 16A | FIG. 16B |
| SD | Title-only | 1015 | 1040 | 1115 | 1140 |
| SD | Title + desc | 1005 | 1030 | 1105 | 1130 |
| FD | Title-only | 1020 | 1045 | 1120 | 1145 |
| FD | Title + desc | 1010 | 1035 | 1110 | 1135 |

The retrieval accuracy of various aspects was evaluated using precision and recall based metrics. The bug localization performance is tabulated using precision at rank r (P@r), recall at rank r (R@r) and Mean Average Precision (MAP) metrics. While P@r measures the accuracy on the retrieved set of files, recall evaluates the completeness of the retrievals. The average precision (AP) for a query Q∈B, on the other hand, is given by $$AP(Q) = \frac{\sum_{r=1}^{RT} P@r \times I(r)}{rel_Q} \qquad (29)$$

where I (r) is a binary function whose value is 1 when the file at rank r is a relevant file, and 0 otherwise. The parameter RT in the summation bound for the total number of highest-ranked files that are examined for the calculation of AP for a given query Q. The denominator $rel_Q$ is the total number of relevant files in the collection for Q. AP estimates the area under the precision-recall curve and therefore it is suitable for comparing the ranking algorithms. MAP is computed by taking the mean of the average precisions for all the queries. In addition to these metrics; the number of hits is also presented (H@r) for the bug reports, which gives the number of bugs for which at least one relevant source file is retrieved in the ranked lists above a certain cut-off point r.

MAP is used for comparing the different retrieval methods as it is the most comprehensive metric that takes into account both the precision and the recall at multiple ranks. In computation of this metric for the results various aspects are set RT=100 in the summation in Eq. (9). In order to evaluate whether the improvements obtained with the proposed approaches are significant or not, the pairwise student's t-test was used on the average precisions for the queries.

For an in-depth analysis of the retrievals, each bug report was divided into two parts, namely Title and Description. Two sets of experiments were conducted using these two parts for each bug report without Query Conditioning (QC): (1) Retrievals with MRF modeling using only the titles of the bug reports. The queries used for these retrieval are denoted "title-only". And (2) Retrieval with MRF modeling using the complete bug reports, that is, including both the titles and the descriptions for the bug reports. The queries used for these retrievals are denoted "title+desc". Then, QC was incorporated in the second category of retrievals and the usefulness of including stack traces and patches in queries was analyzed by comparing the overall retrieval accuracy for the set of bug reports that contain these elements to the remaining set of the bug reports in the query sets.

The model parameters that affect the quality of the retrievals in the retrieval framework are: (1) The window length parameter (W). (2) The mixture parameters of the respective dependency models ($\lambda_{SD}$, $\lambda_{FD}$). And (3) The Dirichlet smoothing parameter ($\mu$). While W sets the upper bound for the number of intervening terms between the terms of the 3-node cliques, $\lambda_{SD}$ and $\lambda_{FD}$ simply adjust the amount of interpolation of the scores obtained with the 2-node cliques with those obtained with the 3-node cliques as explained in Section. As the ranking is invariant to a constant scaling in the mixture parameters, the constraints $\lambda_{FI}+\lambda_{SD}=1$ can be used for the SD and the FD modeling, respectively. In these experiments, the Dirichlet smoothing parameter was set empirically as $\mu=4000$. Note that the retrieval accuracy is not very sensitive to the variations on this parameter.

FIGS. 15A, 15B, 16A, and 16B plot the retrieval accuracies for bug localization in terms of MAP as the window length and the mixture parameters are varied for the "title-only" and the "title+desc" queries. As shown in FIGS. 15A and 16A, a value of 0.2 works well for the mixture parameters in general. Note that when $\lambda_{SD}=\lambda_{FD}=0.0$, SD and FD use only the 2-node cliques hence they reduce to FI, the Smoothed Unigram Model (SUM). As for the window length, FIGS. 15B and 16B illustrate the effect of varying this parameter for $\lambda_{SD}=\lambda_{FD}=0.2$. On average, W=8 results in the best retrieval accuracies for the analyzed projects for both types of queries.

As shown in FIGS. 15A and 16A, when the window length is set as W=2, SD performs better than FD in all experiments across the projects. This is because the terms are required to be adjacent to be matched in the code base when this setting is used and therefore the order of the terms becomes more important. Interestingly, as the window length increases, FD catches up with SD. Overall, SD is less sensitive to the window length parameter, permitting effectively achieving high retrieval accuracies.

FIG. 17 shows an example of retrieval accuracy with the "title-only" queries. FI is considered to be baseline in this example since it is synonymous with SUM. FIG. 18 shows an example of retrieval accuracy for the "title+desc" queries. FI (corresponding to SUM) is treated as baseline, as above.

FIG. 19 shows an example of retrieval accuracy for the "title+desc" queries with Query Conditioning (QC). FI (corresponding to SUM) is treated as baseline, as above.

In this section, the retrieval performances of the dependence models (SD and FD) are compared to the Full Independence (FI) model. The interpolation parameters are fixed as $\lambda_{SD}=\lambda_{FD}=0.2$ and the window lengths as W=8 in the experiments presented below.

FIG. 17 presents the bug localization accuracies on the evaluated projects for the "title-only" queries and MRF modeling. Various results below exemplify the retrieval accuracy of processor 286 for short queries comprising only a few terms. The last row of the table shows the "baseline" accuracy; this is obtained with the FI assumption, which, as mentioned previously, is the same thing as the Smoothed Unigram Model (SUM). The highest score in each column is shown in bold. All the improvements reported in this table obtained with the dependency models over FI are statistically significant at $\alpha=0.05$ level. Note that incorporating the term dependencies into the retrievals improves the accuracy of bug localization substantially in terms of the 6 metrics presented in the table.

Table 18 presents the bug localization accuracies for the "title+desc" queries without QC. That is, the entire textual content of the bug reports, without any query conditioning, is used in querying the code base. The reported improvements obtained with FD and SD over FI are also statistically significant at $\alpha=0.05$ in this table. Note that the retrieval accuracies improve significantly when the description parts of the bug reports are also included in retrievals (even though QC is not included). While SD and FD perform comparably well in these experiment on the Eclipse project, FD outperforms SD on AspectJ on average in terms of MAP.

The results presented in FIGS. 17, 18, and 19 show that incorporating the spatial code proximity and order into the retrievals advantageously improves the accuracy of automatic bug localization. On average, for both short and long queries which may contain stack traces and/or patches, SD and FD modeling enhance the retrieval performance of processor 286 over FI across the projects. The improvements are up to 24.83% for the Eclipse project and up to 14.08% for the AspectJ project in terms of MAP.

The retrieval accuracies obtained with QC on the "title+desc" queries are presented in FIG. 19 where each bug report is first probed for stack traces and patches in order to extract the most useful source code identifiers to be used in bug localization as explained above.

The results presented in FIGS. 18 and 19 show that QC advantageously provides improved query formulation for source code retrieval. For all three forms of the dependency assumption, significant improvements were obtained with QC in terms of the 6 evaluation metrics mentioned in the tables.

Figure 20A:
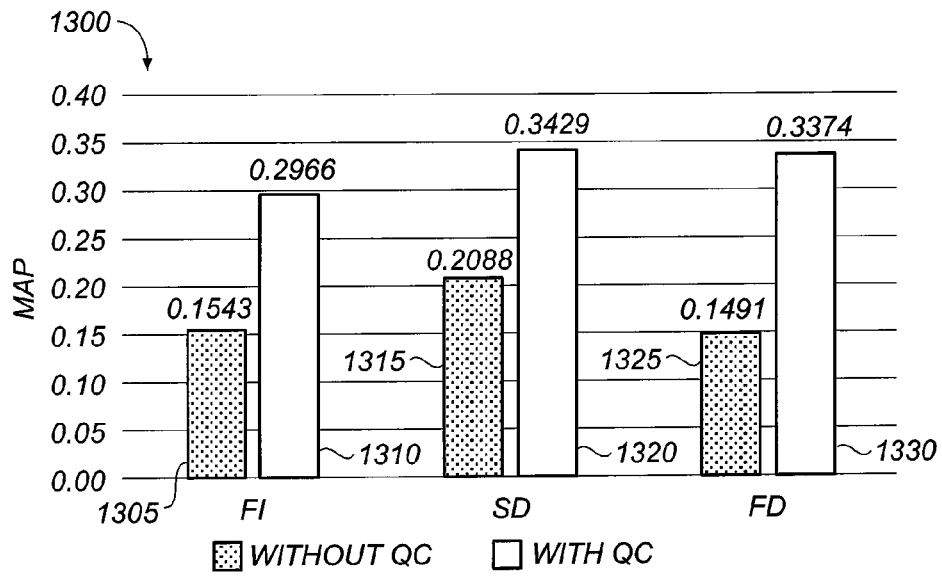
FIGS. 20A and 20B show an example of the effect of Query Conditioning (QC) on bug localization with bug reports containing stack traces.
Figure 20B:
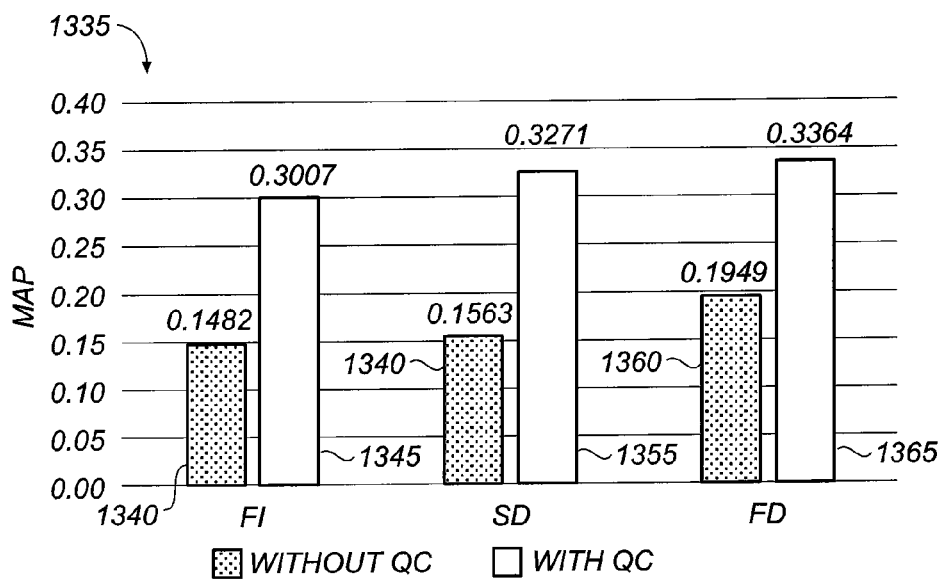

The main benefits of QC are seen for the bug reports that contain stack traces since patches are included only in a few bug reports. FIGS. 20A and 20B present the retrieval accuracies of methods herein (e.g., running on processor 286, FIG. 2) obtained with the bug reports that contain stack traces. The figure shows that accuracy of the retrievals doubles on average with QC for both projects in term of MAP, reaching values above the 0.3 threshold.

FIGS. 20A and 20B show an example of the Effect of Query Conditioning (QC) on bug localization with bug reports containing stack traces. Results for various models are shown, as indicated in Table 13.

TABLE 13

Data shown in FIGS. 20A and 20B

| MRF | QC? | Bar in FIG. 20A | Bar in FIG. 20B |
|---|---|---|---|
| FI | No | 1305 | 1340 |
| FI | Yes | 1310 | 1345 |
| SD | No | 1315 | 1340 |
| SD | Yes | 1320 | 1355 |
| FD | No | 1325 | 1360 |
| FD | Yes | 1330 | 1365 |

FIGS. 20A and 20B also demonstrate the effect of the MRF modeling with stack traces. Comparing the results obtained with the dependency models, FD and SD outperform FI when QC is used in retrievals with the stack traces. The main reason for these results is that the order and the proximity of the terms in stack traces are extremely important in locating the relevant source files. As also mentioned in Section, the likelihood of a file to be relevant to a query increases when it contains longer phrases from the stack trace with the same order and proximity relationships. Interestingly, when the queries are not processed with QC, the average retrieval accuracy with FD on the Eclipse project is slightly lower than FI. This is clearly due to the noise in the lengthy stack traces that contain many method signatures most of which are irrelevant to the bug. The QC framework effectively removes the irrelevant method signatures from the trace for a better query representation.

Studies have shown that the developers who are in charge of fixing bugs look for stack traces, test cases and the steps contained therein, in order to reproduce the bugs, these being the most useful structural elements for comprehending the underlying cause of the bugs and fixing them. Among these structural elements, various aspects of stack traces are very important. They are not only frequently included in bug reports but also a good source of discriminative source code identifiers for automatic bug localization.

Figure 21A:
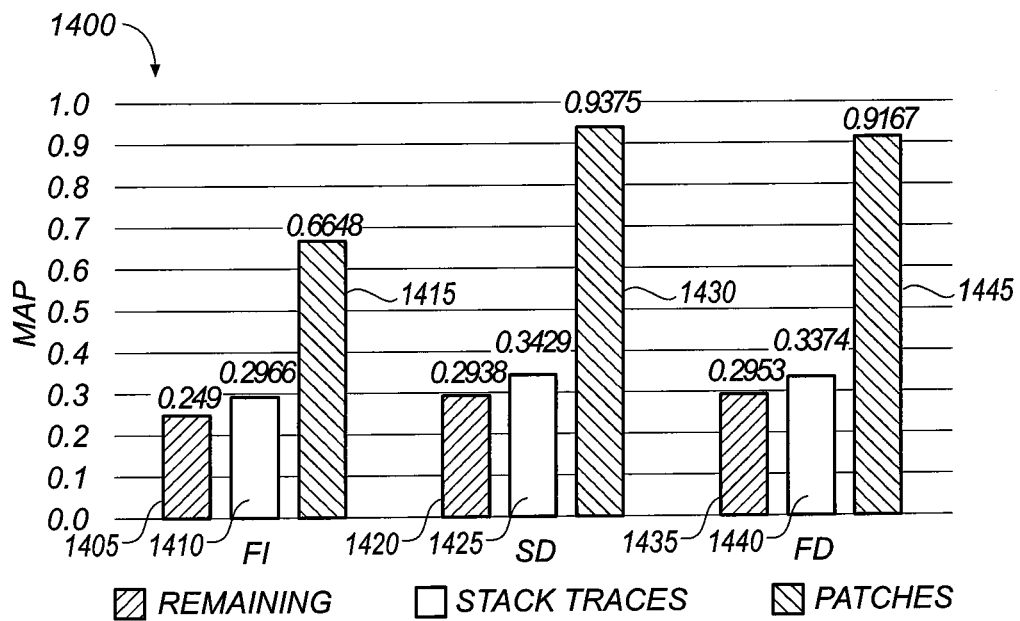
FIGS. 21A and 21B show an example of the effect of including structural elements in bug reports on automatic bug localization accuracy.
Figure 21B:
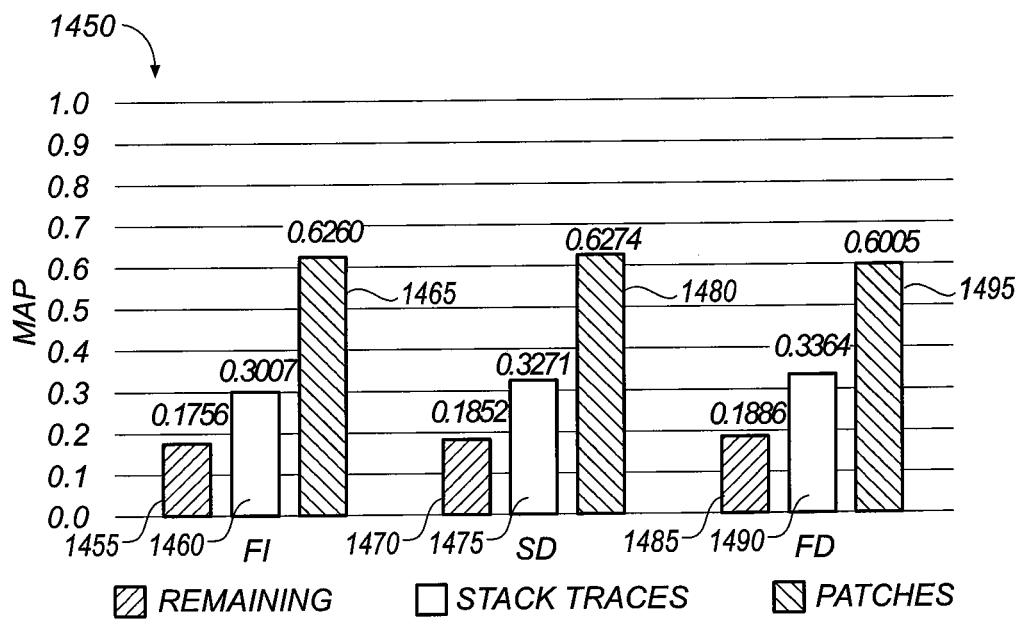

FIGS. 21A and 21B show an example of the retrieval accuracies obtained with the bug reports containing different types of structural elements. In the figure, "remaining" denotes the bug reports that do not contain any stack traces or patches. Results for various models are shown, as indicated in Table 14.

TABLE 14

Data shown in FIGS. 21A and 21B

| MRF | Structures? | Bar in FIG. 21A | Bar in FIG. 21B |
|---|---|---|---|
| FI | None | 1405 | 1455 |
| FI | Traces | 1410 | 1460 |
| FI | Patches | 1415 | 1465 |
| SD | None | 1420 | 1470 |
| SD | Traces | 1425 | 1475 |
| SD | Patches | 1430 | 1480 |
| FD | None | 1435 | 1485 |
| FD | Traces | 1440 | 1490 |
| FD | Patches | 1445 | 1495 |

Effects of including structural elements in bug reports on automatic bug localization accuracy are shown in these figures. Patches lead to the highest retrieval scores while the bug reports with no stack traces or patches provide the least improvement of the techniques compared in these figures in terms of MAP.

In the example presented in FIGS. 21A and 21B, bug reports with patches lead to high accuracies. After the patches, stack traces hold the second position in terms of their usefulness in locating the relevant source code. These results show that including stack traces in the bug reports can improve the bug localization accuracy. Note that the retrieval accuracies obtained with the stack traces are above the 0.3 threshold for the analyzed projects in terms of MAP.

An automatic Query Reformulation (QR) framework is described herein to improve the query representation for bug localization. For experimental evaluation, the title of a bug report can be used as an initial query which is reformulated via Pseudo Relevance Feedback based on the retrieval results obtained with the initial query. The experimental evaluation of the approach showed that the proposed Spatial Code Proximity (SCP) based QR model effectively retrieves relevant documents.

Table 15 and Table 16 show retrieval accuracies. Moreover, the MRF framework provides further improvements to the SCP-based QR (denoted as SCP-QR in the tables) on the average. For the Chrome project, while the differences between the average precisions obtained with the respective models are not statistically significant at $\alpha=0.05$, the differences in terms of the presented recall metrics are. Additionally, H©10 values obtained with the MRF framework are considerably higher than the values obtained with the SCP-QR. For the Eclipse project, both SD and FD performs better than SCP-QR in terms of the reported metrics. The differences are statistically significant at $\alpha=0.05$.

TABLE 15

QR vs. MRF on Eclipse with the "title-only" queries.

| Method | MAP | P@1 | P@5 | R@5 | R@10 | H@10 |
|---|---|---|---|---|---|---|
| FD | 0.2564 | 0.2198 | 0.1110 | 0.3199 | 0.4070 | 2,100 |
| SD | 0.2466 | 0.2116 | 0.1069 | 0.3083 | 0.3934 | 2,042 |
| SCP-QR | 0.2296 | 0.1906 | 0.1014 | 0.2853 | 0.3746 | 1,915 |

TABLE 16

QR vs. MRF on Chrome with the "title-only" queries.

| Method | MAP | P@1 | P@5 | R@5 | R@10 | H@10 |
|---|---|---|---|---|---|---|
| FD | 0.1951 | 0.1844 | 0.1061 | 0.2394 | 0.3159 | 178 |
| SD | 0.1814 | 0.1760 | 0.1039 | 0.2288 | 0.3137 | 177 |
| SCP-QR | 0.1820 | 0.1788 | 0.0933 | 0.2021 | 0.2775 | 151 |

Another important class of IR approaches to bug localization is based on the prior development history. "BugLocator," a retrieval tool that uses the textual similarities between a given bug report and the prior bug reports to enhance the bug localization accuracy, has been proposed. The main motivation behind BugLocator is that the same files tend to get fixed for similar bug reports during the life-cycle of a software project. The software repositories can be mined for the defect and modification likelihoods of the source files in order to estimate a prior probability distribution which could then be used for a more accurate source code retrieval for bug localization.

In a comparative example, the accuracy of BugLocator was evaluated on the Eclipse v3.1 and iBugs datasets. The evaluations on the Eclipse project were performed using 3,075 bug reports filed for the version 3.1 (versus 4,035 bug reports filed for the same version in tests of various inventive aspects). In order to compare the performance of various aspects to that of BugLocator, the experiments were repeated using only the bug reports with which the BugLocator was evaluated.

Figure 22:
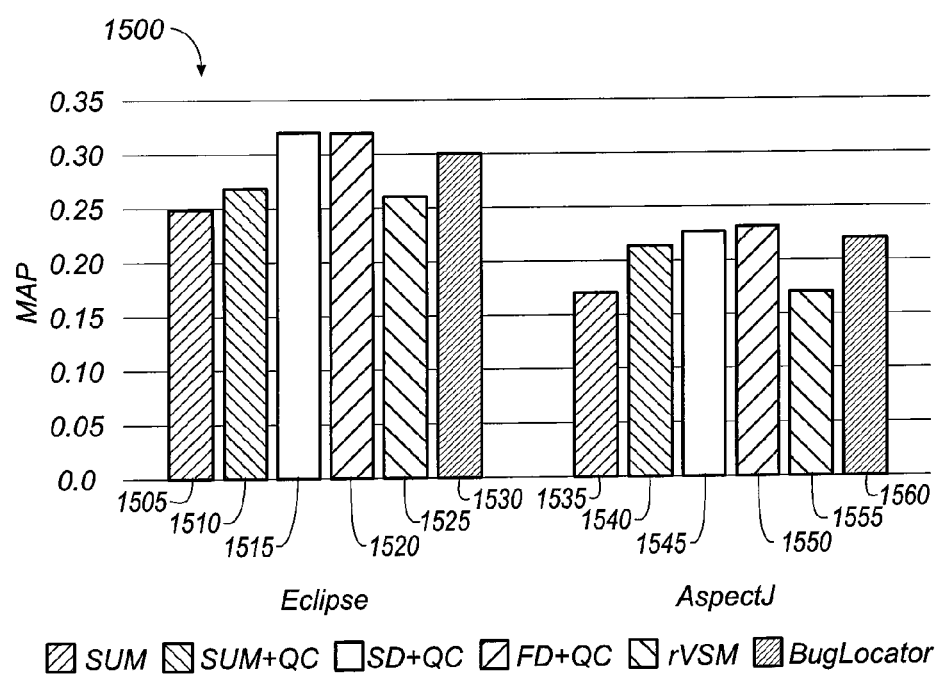
FIG. 22 shows an exemplary comparison of MAP results for various retrieval models for, e.g., bug localization.

FIG. 22 shows an exemplary comparison of MAP results for various retrieval models for Bug Localization. Using the MAP metric, FIG. 22 shows the accuracy of the inventive framework along with the comparative example of BugLocator. In the figure, the accuracies obtained with the revised Vector Space Model (rVSM) were also included. Results for various models are shown, as indicated in Table 17.

TABLE 17

Data shown in FIG. 22

| Project | Model | Bar in FIG. 22 |
|---|---|---|
| Eclipse | SUM | 1605 |
| Eclipse | SUM + QC | 1610 |
| Eclipse | SD + QC | 1615 |
| Eclipse | FD + QC | 1620 |
| Eclipse | rVSM | 1625 |
| Eclipse | BugLocator† | 1630 |
| AspectJ | SUM | 1635 |
| AspectJ | SUM + QC | 1640 |
| AspectJ | SD + QC | 1645 |
| AspectJ | FD + QC | 1650 |
| AspectJ | rVSM | 1655 |
| AspectJ | BugLocator† | 1660 |

†A comparative example

According to the authors of BugLocator, rVSM yields retrieval results superior to those obtained with the classic Vector Space Model (VSM). As shown in FIG. 22, FD+QC and SD+QC outperform BugLocator with MAP values above 0.32 threshold for the Eclipse project. In comparison, BugLocator performs better than SUM and SUM+QC with a MAP value of 0.30, while SUM+QC outperforms rSVM. The performance comparisons with the different models are similar for the AspectJ project.

Various aspects show that TFIDF model incorporating defect histories of the software artifacts (TFIDF+DHbPd) reaches a MAP value of 0.2258 on the AspectJ project.

Various aspects herein advantageously provide improved performance without leveraging the past development history for a software library. Various aspects described above advantageously provide improved performance by using the past development history for a software library. Either approach can be used to provide improved performance compared to prior schemes.

Various aspects advantageously improve the retrieval accuracy for bug localization by including code proximity and order information. In various aspects, QC advantageously improves the query representation vis-a-vis the source code. In various aspects, including stack traces in the bug reports improves the accuracy of the bug localization. In various aspects, the MRF-based retrieval framework provides improved performance compared to the Query Reformulation (QR) based retrieval frameworks for bug localization.

Traditional methods for bug localization rely on the dynamic or the static properties of software. Whereas dynamic approaches require that a set of test cases be executed to locate the parts of the program causing the bug, static approaches aim to leverage the static properties of the software such as its function call graphs, dependency relationships between the code segments, etc. The main problem with the static approaches is that they tend to return too many false positives. Although dynamic approaches tend to be more accurate than static methods, designing an exhaustive set of test cases that could effectively be used to reveal defective behaviors is very difficult and expensive. Various aspects of the bug localization approach do not require the execution of a program, not to speak of the fact that it is also lightweight and inexpensive.

Concept location, feature/concern location and bug localization are closely related problems in software engineering. Early work on using text retrieval methods for concept location includes the use of Latent Semantic Indexing (LSI) to retrieve the software artifacts in response to short queries. The retrievals are performed in the lower dimensional LSI space which assigns greater importance to the terms that frequently co-occur in the source files. This framework can also be used to expand a given initial query that includes a single query term initially. This approach has been extended to include formal concept analysis. They showed that the irrelevant search results returned by the LSI model can be reduced with formal concept analysis. Hybrid methods that combine dynamic analysis with Information Retrieval (IR) have also been proposed in this area.

Source code identifiers have been leveraged to automatically extract the phrases relevant to a given initial query. These phrases were then used to either find the relevant program elements or to manually reformulate the query for superior feature/concern localization. The effect of the position of a query term on the accuracy of the search results has been investigated. Various references describe that the location of a query term in the method signatures and in the method bodies determines its importance in the search process.

Explicit Relevance Feedback for Query Reformulation (QR) has been described for the purpose of concept location. This framework requires developers to engage in an iterative query/answer session with the search engine. At each iteration, the developer is expected to judge the relevance of the returned results vis-à-vis the current query. Based on these judgments, the query is reformulated with the Rocchio's formula and resubmitted to obtain the next round of retrieval results. This process is repeated until the target file is located or the developer gives up.

"Refocus," an automatic QR tool for text retrieval in software engineering, has been described. Refocus automatically reformulates a given query by choosing the best QR technique which is determined by training a decision tree on a separate query set and their retrieval results. After training, based on the statistics of the given query, the decision tree recommends an automatic query reformulation technique that is expected to perform the best among the others.

In various aspects, the links between the bug tracking databases and the corresponding development effort in the software repositories are reconstructed. This reconstruction step is performed using regular expressions to link the bug reports to the repository commits based on the commit messages.

Presented herein is an IR framework for automatic bug localization that takes into account the spatial code proximity and term ordering relationships in a code base for improved retrieval accuracy. Various aspects use a fuzzy matching mechanism between the term blocks of the queries and the source code. Markov Random Fields capture both the positional and the order attributes of the terms in source files. Experimental validation was performed involving large open-source software projects and over 4,000 bugs, and established that the retrieval performance improved significantly when both the proximity and ordering relationships between the terms are taken into account.

The experimental evaluation also demonstrates that in conjunction with the MRF model, the proposed Query Conditioning (QC) approach effectively exploits the different types of structural information that is frequently included in bug reports. The structural elements in bug reports—particularly stack traces—contain useful information. Improved bug localization accuracies can advantageously be achieved using MRF modeling with QC.

In various aspects, a method of searching a corpus including a plurality of files includes automatically performing the following steps using a processor. Terms are extracted from queries based on connectivity patterns (e.g., SD, FD, FI discussed above). For example, a respective plurality of terms can be extracted from each of the files and a position in that file associated with each extracted term. The graph of the connectivity patterns of the extracted terms can then be constructed from the words, as discussed above. A query is received and includes one or more search term(s). QC can be used, as discussed below. A respective textual ranking (e.g., $P(Q, f)$) is determined for each file using the query and the graph. For example, the distribution of the extracted query terms in the files can be determined and used for ranking. The positions of the terms can be considered both in the queries and in the source code files (or methods or other subprograms). This permits assigning relatively higher textual rankings to files or methods that have the query terms in close proximity and in the same order as the query, and relatively lower textual rankings to files or methods that have fewer of the query terms, do not have the terms in proximity, or do not have the terms in order.

In various aspects, a QC process such as those described above is applied to preprocess the queries. QC can be applied to any query or selectively applied to some types of queries, e.g., queries that are long or contain structural elements such as stack traces or patches, as discussed above. For example, the query can include a bug report. QC steps of the method can include automatically determining whether a patch or stack trace is present in the bug report and, if so, selecting a plurality of targeted terms from the patch or stack trace. The step of determining the textual ranking can then include determining the respective textual ranking for each file using the targeted terms and the graph.

FIG. 2 is a high-level diagram showing the components of an exemplary data-processing system for analyzing data and performing other analyses described herein, and related components. The system includes a processor 286, a peripheral system 220, a user interface system 230, and a data storage system 240. The peripheral system 220, the user interface system 230 and the data storage system 240 are communicatively connected to the processor 286. Processor 286 can be communicatively connected to network 250 (shown in phantom), e.g., the Internet or an X.25 network, as discussed below. Processor 286, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 286 can implement processes of various aspects described herein, e.g., SUM, MRF, QC, the model of Eq. 7 or Eq. 21, or combinations thereof. Processor 286 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 286 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 220, user interface system 230, and data storage system 240 are shown separately from the data processing system 286 but can be stored completely or partially within the data processing system 286.

The peripheral system 220 can include one or more devices configured to provide digital content records to the processor 286. For example, the peripheral system 220 can include digital still cameras, digital video cameras, cellular phones, or other data processors. The processor 286, upon receipt of digital content records from a device in the peripheral system 220, can store such digital content records in the data storage system 240.

The user interface system 230 can include a mouse, a keyboard, another computer (connected, e.g., via a network or a null-modem cable), or any device or combination of devices from which data is input to the processor 286. The user interface system 230 also can include a display device, a processor-accessible memory, or any device or combination of devices to which data is output by the processor 286. The user interface system 230 and the data storage system 240 can share a processor-accessible memory.

In various aspects, processor 286 includes or is connected to communication interface 215 that is coupled via network link 216 (shown in phantom) to network 250. For example, communication interface 215 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 215 sends and receives electrical, electromagnetic or optical signals that carry digital or analog data streams representing various types of information across network link 216 to network 250. Network link 216 can be connected to network 250 via a switch, gateway, hub, router, or other networking device.

Processor 286 can send messages and receive data, including program code, through network 250, network link 216 and communication interface 215. For example, a server can store requested code for an application program (e.g., a JAVA applet) on a tangible non-volatile computer-readable storage medium to which it is connected. The server can retrieve the code from the medium and transmit it through network 250 to communication interface 215. The received code can be executed by processor 286 as it is received, or stored in data storage system 240 for later execution.

Data storage system 240 can include or be communicatively connected with one or more processor-accessible memories configured to store information. The memories can be, e.g., within a chassis or as parts of a distributed system. The phrase "processor-accessible memory" is intended to include any data storage device to or from which processor 286 can transfer data (using appropriate components of peripheral system 220), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 240 can be a tangible non-transitory computer-readable storage medium, i.e., a non-transitory device or article of manufacture that participates in storing instructions that can be provided to processor 286 for execution.

In an example, data storage system 240 includes code memory 241, e.g., a RAM, and disk 243, e.g., a tangible computer-readable rotational storage device such as a hard drive. Computer program instructions are read into code memory 241 from disk 243. Processor 286 then executes one or more sequences of the computer program instructions loaded into code memory 241, as a result performing process steps described herein. In this way, processor 286 carries out a computer implemented process. For example, steps of methods described herein, blocks of the flowchart illustrations or block diagrams herein, and combinations of those, can be implemented by computer program instructions. Code memory 241 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 286 (and possibly also other processors), to cause functions, acts, or operational steps of various aspects herein to be performed by the processor 286 (or other processor). Computer program code for carrying out operations for various aspects described herein may be written in any combination of one or more programming language(s), and can be loaded from disk 243 into code memory 241 for execution. The program code may execute, e.g., entirely on processor 286, partly on processor 286 and partly on a remote computer connected to network 250, or entirely on the remote computer.

The invention is inclusive of combinations of the aspects described herein. References to "a particular aspect" (or "embodiment" or "version") and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method of searching a corpus including a plurality of files, comprising automatically performing the following steps using a processor:
    extracting a file revision date from metadata associated with each of the files in order to construct a historical timeline of modifications made to each file;
    scanning the entirety of each file with a first window of a specified fixed size, the size of the window being the number of consecutively occurring words, and recording the frequencies of the words occurring individually and in pairs;
    representing each corpus file by a set of corpus file vectors of frequencies, with a first corpus file vector representing the word frequencies and a second corpus file vector representing the frequencies of pairs of words occurring together, wherein frequencies that are associated with single words are represented in separate corpus file vectors than frequencies that are associated with pairs of words containing the single words;
    receiving a query including one or more search term(s);
    scanning the entire query with a second window of said specified fixed size and recording the frequencies of the words occurring individually and in pairs;
    representing the query through a set of query vectors of frequencies, with a first query vector representing the word frequencies and a second query vector representing the frequencies of pairs of words occurring together, wherein frequencies that are associated with single words are represented in separate query vectors than frequencies that are associated with pairs of words containing the single words;
    comparing the set of query vectors with the set of corpus file vectors, the first query vector being compared with the first corpus file vector, and the second query vector being compared with the second corpus file vector;
    weighting the similarity between the query vectors and the corresponding corpus file vectors by a decay factor that gives less weight to a file the older the file modification date;
    combining the similarity scores from like vector comparisons using Markov Random Fields into an overall similarity score between a query and each of the corpus files; and
    determining a respective textual ranking for each file based on the overall similarity scores calculated between the query and the files.

2. The method according to claim 1, further including producing a list of a selected number of the files having the highest respective textual rankings.

3. The method according to claim 1, further including automatically preparing an index of the contents of the files using the processor, the step of determining the respective textual ranking including retrieving from the index respective term frequency(ies) for one or more of the search term(s) in the respective file, and combining the retrieved respective term frequency(ies).

4. The method according to claim 3, further including receiving a second corpus including a second plurality of files and repeating the, extracting, scanning, representing each corpus file, receiving, representing the query, comparing, weighting, combining, and determining-textual-ranking steps using the second plurality of files.

5. The method according to claim 3, the step of preparing an index including automatically tokenizing the contents of each file according to a type of the file.

6. The method according to claim 1, the step of determining the respective textual ranking including applying word ordering constraints when comparing the query vector with file vectors using Markov Random Fields.

7. The method according to claim 1, the step of determining the respective textual ranking including normalizing the determined textual ranking with respect to the plurality of files in the corpus.

8. The method according to claim 1, wherein the metadata includes a plurality of changeset records, each changeset record including respective contents and a respective list of files corresponding to that changeset record, the step of determining the respective textual ranking further including automatically: a) determining a respective ranking contribution for each file and each changeset record; and b) combining the respective ranking contributions for the changeset records corresponding to each file to provide the textual ranking for that file.

9. The method according to claim 8, the step of determining the ranking contribution further including automatically determining a type of each changeset record using the contents of that changeset record and determining the respective ranking contribution based on the determined type.

10. The method according to claim 1, wherein the query includes a bug report.

11. The method according to claim 1, wherein the set of corpus file vectors and query vectors further include vectors corresponding to groupings of three or more words in the scanning window.

12. A data processing system, comprising:
a) a storage system storing a corpus including a plurality of files;
b) a processor configured to automatically:
  i) extract a file revision date from the metadata associated with the files in order to construct a historical timeline of modifications made to each file;
  ii) scan the entirety of each file with a window of a specified fixed size, the size of the window being the number of consecutively occurring words, and recording the frequencies of the words occurring individually and in pairs;
  iii) represent each corpus file by a set of corpus file vectors of frequencies, with a first corpus file vector representing the word frequencies and a second corpus file vector representing the frequencies of pairs of words occurring together, wherein frequencies that are associated with single words are represented in separate corpus file vectors than frequencies that are associated with pairs of words containing the single words;
  iv) receive a query including one or more search term(s);
  v) scan the entire query with a second window of said specified fixed size and record the frequencies of the words occurring individually and in pairs;
  vi) represent the query through a set of query vectors of frequencies, with a first query vector representing the word frequencies and a second query vector representing the frequencies of pairs of words occurring together;
  vii) compare the set of query vectors with the set of corpus file vectors, the first query vector being compared with the first corpus file vector, and the second query vector being compared with the second corpus file vector;
  viii) weight the similarity between the query vectors and the file vectors by a decay factor that gives less weight to a file the older the file modification date;
  ix) combine the similarity scores from like vector comparisons using Markov Random Fields into an overall similarity score between a query and each of the corpus files; and
  x) determine a respective textual ranking for each file based on the overall similarity scores calculated between the query and the files; and
  xi) select one or more of the file(s) as query results using the determined textual ranking(s) of the file(s); and
c) a user interface system configured to receive query results from the processor and present them to a user.

13. The system according to claim 12, the processor further configured to prepare an index of the contents of the files, store the prepared index on the storage system, and determine the respective textual ranking by retrieving from the stored index respective term frequency(ies) for one or more of the search term(s) in the respective file, and then combining the retrieved respective term frequency(ies).

14. The system according to claim 13, wherein the storage system further stores a second corpus including a second plurality of files and the processor is further configured to prepare an index of the second plurality of files, extract metadata from the second plurality of files, represent each file in the second plurality of files as a file vector of word frequencies, scan the entirety of each file with a window of a specified size, the size of the window being the number of consecutively occurring words, and recording the frequencies of the words occurring individually and in pairs, represent each of the second plurality of files by a set of corpus file vectors of frequencies, with a first corpus file vector representing the word frequencies and a second corpus file vector representing the frequencies of pairs of words occurring together, receive a second query, scan the entire query with a second window of said specified fixed size and recording the frequencies of the words occurring individually and in pairs, represent the second query through a set of query vectors of frequencies, with a first query vector representing the word frequencies and a second query vector representing the frequencies of pairs of words occurring together, compare the set of query vectors with the set of corpus file vectors, the first query vector being compared with the first corpus file vector, and the second query vector being compared with the second corpus file vector, weight the similarity between the query vectors and the corresponding corpus file vectors by a decay factor that gives less weight to a file the older the file modification date, combine the similarity scores from like vector comparisons using Markov Random Fields into an overall similarity score between a query and each of the second plurality of files; and determine textual rankings of the second plurality of files with respect to the second query.

15. The system according to claim 12, the processor configured to determine the respective textual ranking by applying word ordering constraints when comparing the query vector with file vectors using Markov Random Fields.

16. The system according to claim 12, the processor configured to determine the respective textual ranking by normalizing the determined historical ranking with respect to the plurality of files in the corpus.

17. The system according to claim 12, wherein the metadata includes a plurality of changeset records, each changeset record including respective contents and a respective list of files corresponding to that changeset record, and the processor is configured to determine the respective textual ranking by determining a respective ranking contribution for each file and each changeset record; and combining the respective ranking contributions for the changeset records corresponding to each file.

18. The system according to claim 17, the processor configured to determine the ranking contribution by determining a type of each changeset record using the contents of that changeset record and determining the respective ranking contribution based on the determined type.

19. The system according to claim 12, wherein the query includes a bug report.

20. The system according to claim 12, wherein the set of corpus file vectors and query vectors further include vectors corresponding to groupings of three or more words in the scanning window.

\* \* \* \* \*